US012576447B2

(12) United States Patent
Couitt et al.

(10) Patent No.: US 12,576,447 B2
(45) Date of Patent: Mar. 17, 2026

(54) OPTICAL FIBER MODULES FOR ADDITIVE MANUFACTURING SYSTEMS

(71) Applicant: VulcanForms Inc., Devens, MA (US)

(72) Inventors: Stephen C. Couitt, Brighton, MA (US); MAnuel Joseph Leonardo, Bolton, MA (US); Michael von Dadelszen, Merrimack, NH (US); Martin C. Feldmann, Sudbury, MA (US); Jonathan Robert Silva, Portsmouth, NH (US)

(73) Assignee: VulcanForms Inc., Devens, MA (US)

( * ) Notice: Subject to any disclaimer, the term of this patent is extended or adjusted under 35 U.S.C. 154(b) by 78 days.

(21) Appl. No.: 18/105,433

(22) Filed: Feb. 3, 2023

(65) Prior Publication Data

US 2023/0249259 A1      Aug. 10, 2023

Related U.S. Application Data

(60) Provisional application No. 63/306,981, filed on Feb. 4, 2022.

(51) Int. Cl.
*G02B 6/26* (2006.01)
*B22F 10/28* (2021.01)
(Continued)

(52) U.S. Cl.
CPC .............. *B22F 12/44* (2021.01); *B22F 10/28* (2021.01); *B22F 10/36* (2021.01); *B22F 12/90* (2021.01); *G02B 6/262* (2013.01); *G02B*

*6/3897* (2013.01); *B22F 2999/00* (2013.01); *B33Y 10/00* (2014.12); *B33Y 30/00* (2014.12)

(58) Field of Classification Search
CPC .. G02B 6/262; G02B 6/3897; G02B 27/1006; G02B 6/241; G02B 6/3849; G02B 6/4236; G02B 6/44528
See application file for complete search history.

(56) References Cited

U.S. PATENT DOCUMENTS 6,347,178 B1      2/2002   Edwards et al.
9,956,612 B1      5/2018   Redding et al.
(Continued)

OTHER PUBLICATIONS

International Search Report and Written Opinion mailed Jun. 26, 2023 in connection with International Application No. PCT/US 23/12289.
(Continued)

*Primary Examiner* — Eric Wong
(74) *Attorney, Agent, or Firm* — Wolf, Greenfield & Sacks, P.C.

(57) ABSTRACT

Systems and methods for additive manufacturing are generally described. In some embodiments, an additive manufacturing system may include at least one mechanical fixture in the form of a resilient member for accurately positioning one or more optical fibers without the use of adhesives. The resilient member may, in some embodiments, bias each optical fiber (or similarly, an endcap coupled to a distal end of an optical fiber) against an alignment fixture to maintain a desired position and/or orientation of the fiber or endcap. In some embodiments, an additive manufacturing system may include at least one stray light baffle for reducing the amount of stray light within the optical system.

46 Claims, 19 Drawing Sheets

(51) Int. Cl.
    *B22F 10/36*         (2021.01)
    *B22F 12/44*         (2021.01)
    *B22F 12/90*         (2021.01)
    *G02B 6/38*         (2006.01)
    *B33Y 10/00*         (2015.01)
    *B33Y 30/00*         (2015.01)

(56) References Cited

U.S. PATENT DOCUMENTS

| | | | |
|---|---|---|---|
| 10,022,795 B1 | 7/2018 | Redding et al. | |
| 10,620,446 B1 * | 4/2020 | Ho | G02B 27/1073 |
| 10,875,094 B2 | 12/2020 | Feldmann et al. | |
| 10,919,090 B2 | 2/2021 | Feldmann et al. | |
| 10,971,896 B2 * | 4/2021 | Zediker | B22F 12/45 |
| 11,247,396 B2 | 2/2022 | Sweetland | |
| 11,453,087 B2 | 9/2022 | Sweetland | |
| 11,602,891 B2 | 3/2023 | Sweetland | |
| 2013/0194753 A1 * | 8/2013 | Wang | G02B 6/4261 |
| | | | 361/720 |
| 2016/0158889 A1 | 6/2016 | Carter et al. | |
| 2016/0170143 A1 | 6/2016 | Mizushima et al. | |
| 2016/0368050 A1 | 12/2016 | Morris et al. | |
| 2017/0021455 A1 | 1/2017 | Dallarosa et al. | |
| 2017/0056975 A1 | 3/2017 | Carter et al. | |
| 2018/0200792 A1 | 7/2018 | Redding et al. | |
| 2018/0207722 A1 | 7/2018 | Feldmann et al. | |
| 2018/0214980 A1 | 8/2018 | Gross et al. | |
| 2018/0236549 A1 | 8/2018 | Spears et al. | |
| 2019/0143406 A1 | 5/2019 | Carter et al. | |
| 2019/0299286 A1 | 10/2019 | Feldmann et al. | |
| 2020/0039000 A1 | 2/2020 | Sweetland | |
| 2020/0108465 A1 | 4/2020 | Sweetland | |
| 2020/0173854 A1 | 6/2020 | Munro | |
| 2020/0230745 A1 | 7/2020 | Komsta et al. | |
| 2020/0306880 A1 * | 10/2020 | Vorontsov | B29C 64/245 |
| 2020/0366048 A1 | 11/2020 | Vorontsov et al. | |
| 2020/0376600 A1 | 12/2020 | Aggarwal et al. | |
| 2020/0376761 A1 | 12/2020 | Sweetland | |
| 2020/0376773 A1 | 12/2020 | Sweetland | |
| 2020/0384684 A1 * | 12/2020 | Karafin | G02B 27/0025 |
| 2021/0060857 A1 | 3/2021 | Sweetland | |
| 2021/0229215 A1 * | 7/2021 | Weston | B23K 26/0608 |
| 2021/0252640 A1 | 8/2021 | Feldmann | |
| 2021/0339318 A1 | 11/2021 | Dunbar et al. | |
| 2021/0387263 A1 | 12/2021 | Komsta et al. | |
| 2021/0402480 A1 | 12/2021 | Sweetland | |
| 2022/0009030 A1 | 1/2022 | Dadelszen et al. | |
| 2022/0082763 A1 * | 3/2022 | Verheyden | G02B 6/3885 |
| 2022/0219260 A1 | 7/2022 | Feldmann | |
| 2023/0056367 A1 * | 2/2023 | Leonardo | B29C 64/277 |

OTHER PUBLICATIONS

PCT/US 23/12289, Jun. 26, 2023, International Search Report and Written Opinion.

* cited by examiner

D1 ← → D2

OPTICAL FIBER MODULES FOR ADDITIVE MANUFACTURING SYSTEMS

CROSS-REFERENCE TO RELATED APPLICATIONS

This application claims the benefit of priority under 35 U.S.C. § 119(e) of U.S. Provisional Application Ser. No. 63/306,981, filed Feb. 4, 2022, the disclosure of which is incorporated herein by reference in its entirety.

FIELD

Disclosed embodiments are generally related to additive manufacturing systems and methods. More specifically, systems and methods employing the use of mechanical fixtures for accurate positioning of optical elements and/or optical baffles for stray light redirection are described.

BACKGROUND

The manufacturing speed and throughput of some additive manufacturing systems such as powder bed fusion systems is limited by the rate at which the powdered material can be fused. The rate of material fusion is dependent on multiple factors, including the total power delivered to the powdered material in the build volume of the system, as well as the energy per unit mass used to fuse the powdered material. In some instances, such as in systems utilizing one or more laser energy sources to deliver power to the build volume, the rate of fusion may be increased by including a plurality of laser energy sources. For example, by increasing the number of laser energy sources that can simultaneously fuse powder in a powder bed fusion process, the total power delivered to the build volume may be increased, and thus the rate of fusion can be increased.

SUMMARY

In one embodiment, an additive manufacturing system includes: at least one laser energy source; an optics assembly configured to direct laser energy from the at least one laser energy source onto a build surface to form at least one laser energy spot on the build surface; at least one optical fiber optically coupling the at least one laser energy source with the optics assembly; a holder configured to support at least a portion of the at least one optical fiber; and a resilient member configured to bias at least a portion of the at least one optical fiber towards the holder.

In one embodiment, a method for additive manufacturing includes: transmitting laser energy from at least one laser energy source along an axial dimension of at least one optical fiber; and biasing at least a portion of the at least one optical fiber towards a holder with a resilient member, the holder configured to support the at least a portion of the at least one optical fiber.

In one embodiment, an additive manufacturing system includes: at least one laser energy source; an optics assembly configured to direct laser energy from the at least one laser energy source onto a build surface to form at least one laser energy spot on the build surface; at least one optical fiber configured to optically couple the at least one laser energy source with the optics assembly; and at least stray light baffle optically coupled to at least one optical fiber, the at least one stray light baffle disposed between a distal end and a proximal end of the at least one optical fiber, the at least one stray light baffle comprising at least one tapered surface configured to redirect at least a portion of stray laser energy directed toward the at least one laser energy source.

In one embodiment, a method for additive manufacturing includes: transmitting laser energy from at least one laser energy source along a longitudinal direction of at least one optical fiber; redirecting at least a portion of stray laser energy directed toward the at least one laser energy source with at least one tapered surface of at least one stray light baffle, the at least one stray light baffle optically coupled to the at least one optical fiber, the at least one optical baffle disposed along a length of the at least one optical fiber between a distal end and a proximal end of the at least one optical fiber; and directing laser energy output from a distal portion of the at least one optical fiber onto a build surface to form at least one laser energy spot on the build surface.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

Other advantages and novel features of the present disclosure will become apparent from the following detailed description of various non-limiting embodiments of the disclosure when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
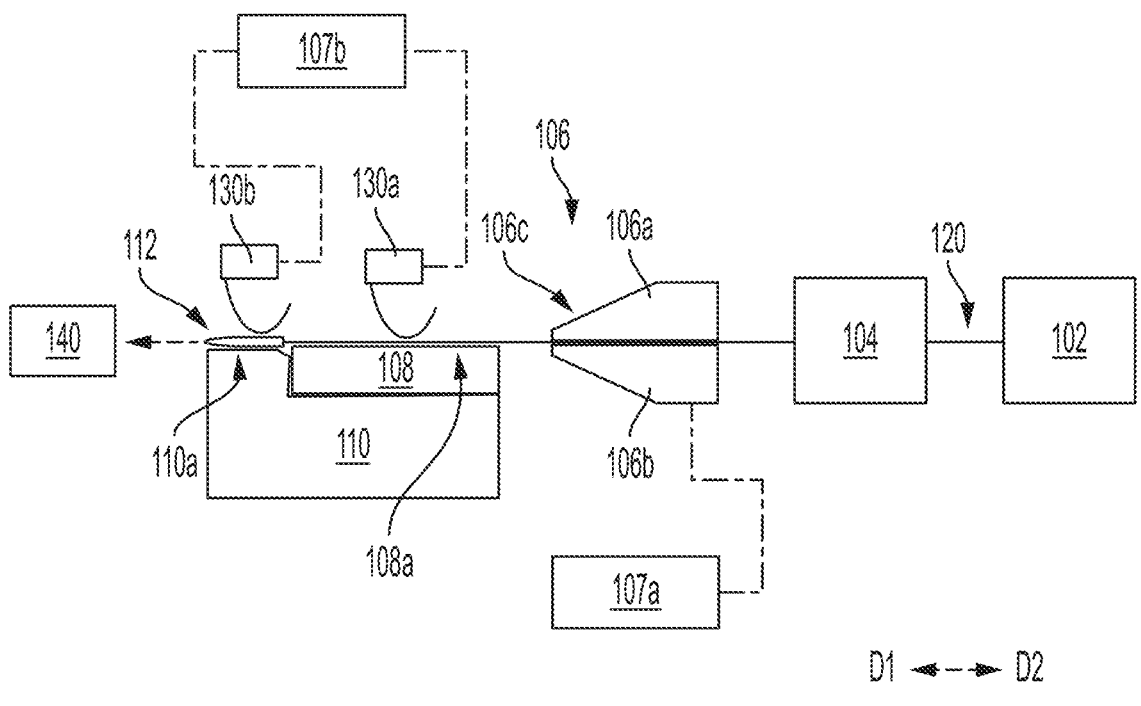
FIG. 1 shows, according to some embodiments, a schematic of a portion of a fiber optic assembly of an additive manufacturing system.

The Inventors have appreciated that additive manufacturing systems utilizing multiple optical fibers, which may be arranged in an array format, to deliver laser energy from one or more laser energy sources to powder in a build volume can present various challenges. For example, it may be difficult to accurately align the optical fibers relative to downstream optics (e.g., lenses, lens arrays, mirrors, etc.) for precise energy delivery. In some instances, additive manufacturing systems can use adhesives (e.g., epoxy resins) to fix or align a portion of the optical fibers relative to the relevant optical components.

The Inventors have recognized that in some cases, the heat generated by delivering large powers to a build surface through the optical fibers can damage or otherwise degrade the adhesives. This degradation can result in a variety of undesirable outcomes. For example, adhesives at elevated temperatures can undergo outgassing, releasing a gas which can condense on nearby surfaces, thus, coating and/or otherwise contaminating them. The heated adhesive could also thermally expand, and subsequently move the optical fibers out of alignment with optical components of the system. This may be in addition to the heated adhesives potentially undergoing a change in their mechanical or thermal properties relative to their unheated state. Thus, the use of adhesives may result in an undesirable amount of stress or strain being placed on the optical fibers due to component movement and/or material property changes as the adhesives degrade. Thus, the Inventors have recognized that various undesirable outcomes associated with heated adhesives can result in distortion or misalignment of the optical path of the laser energy sources, which can result in damage or dysfunction of the manufacturing system.

In view of the above, the Inventors have recognized and appreciated the numerous benefits associated with an additive manufacturing system employing mechanical fixtures for retaining a desired position of optical fibers relative to other optical components in a system at locations where heating due to scattering, back reflection, and other effects may occur, though such systems may be used in other locations as well. Thus, the mechanical fixtures may serve to maintain a position of the optical fibers even when localized heating of the optical fibers and/or associated components occurs during operation. The Inventors have also recognized the benefits associated with mechanical fixtures which can accommodate variations in optical fiber sizes within an array, such that each optical fiber in the array is retained or otherwise fixed in the same manner.

The use of mechanical fixtures offers several benefits, including, for example, improved registration of the optical fibers with a desired position with the system. Additionally, in some cases, the mechanical fixtures may be configured to cool or otherwise direct heat (e.g., heating from laser energy leakage) away from the optical fiber. Of course, while several potential benefits are listed above, it should be understood that embodiments in which not all of the listed benefits and/or different benefits are provided by a mechanical fixture are also contemplated as the disclosure is not limited to only the listed benefits.

In some embodiments, an additive manufacturing system may employ one or more mechanical fixtures in the form of one or more resilient members to bias or otherwise retain one or more optical fibers, or one or more components (e.g., one or more endcaps) coupled to the one or more optical fibers, in a desired position relative to one or more downstream components of an optics system which serves to direct laser energy from one or more laser energy sources to a build surface of an additive manufacturing system. The one or more resilient members may apply a force either directly, or indirectly, to one or more optical fibers that is directed towards an underlying supporting portion of the mechanical fixture located opposite from the one or more resilient members. In some embodiments, the supporting portion of the mechanical fixture may be an alignment fixture (e.g., a fiber holder) configured to keep at least a portion of the fibers aligned and oriented in a desired direction and position within the alignment fixture. This may facilitate coupling of the alignment fixture and the associated optical fibers with the overall optics assembly of the system including optical components such as lenses, optics stacks, and/or other optical components located downstream from the one or more optical fibers. In some embodiments, the mechanical fixture may include a clamp which serves to prevent or reduce transverse (e.g., perpendicular to the longitudinal axis of the fibers) movement of at least a portion of the optical fibers. In some embodiments, the mechanical fixtures may be configured to retain or otherwise fix a portion of the optical fibers without the use of adhesives. Specific constructions and features of resilient members are described in greater detail with reference to the figures below.

In addition to the above, the Inventors have also recognized that in some cases, various interfaces in the optical assembly (e.g., the distal surfaces of the optical fibers) can act as interfaces that may result in scattering, back reflection, and/or absorption of a portion of the laser energy transmitted through the optical fibers. Thus, when the laser energy sources are operated to deliver large powers to a build surface, these interfaces may result in undesirable heating of the ends of the optical fibers as well as undesirable back reflection of laser energy towards the associated laser energy source(s). This may result in damage to the laser source(s) as well as cyclic heating and cooling of the distal ends of the optical fibers as the lasers are repeatedly cycled between the on and off states during an additive manufacturing process. Additionally, at sufficiently high power settings, this heating of the distal ends of the optical fibers can even result in melting of the optical fibers. In some cases, heating of the optical fibers can result in losses in power transmission efficiency of the additive manufacturing system.

In view of the above, the Inventors have recognized and appreciated the numerous benefits associated with an additive manufacturing system employing a stray light baffle configured to redirect stray (e.g., scattered, reflected, back scattered, back reflected, refracted, diffuse, etc.) light or laser energy that is propagating toward one or more optically coupled laser energy sources. The stray light baffle may be in optical communication, and in some instances in direct contact, with the one or more optical fibers optically coupled with the laser energy source. In this way, the stray light baffle may be shaped and constructed to reduce the amount of light directed back towards the energy source. The stray light baffle may also reduce the amount of stray light directed away from the laser source, which may locally heat the optical fibers in an undesirable fashion. In some cases, the stray light baffle may also serve to cool or otherwise direct heat (e.g., laser energy) away from the one or more optical fibers. Of course, while several potential benefits are listed above, it should be understood that embodiments in which not all of the listed benefits and/or different benefits are provided by an optical element are also contemplated as the disclosure is not limited to only the listed benefits.

As noted above, in some embodiments, an additive manufacturing system may employ one or more stray light baffles to deflect or otherwise redirect (e.g., scatter) at least a portion of stray light transmitted through the one or more optical fibers. In the absence of the stray light baffle, at least a portion of the stray light may be directed toward the one or more laser energy sources or other components, which can damage the laser energy source, optical fibers, and/or other components in the surrounding environment. The stray light baffle(s) may be optically connected to the optical fibers, such that stray light may pass from the fibers to the baffle to be redirected out of the main optical pathway between the laser energy source and the build volume. In some embodiments, a portion of the stray light baffle may be in direct contact with at least a portion of the optical fibers, minimizing the air gap between the baffle and optical fibers (which may exhibit a lower index of refraction) to optimize light transport. For example, in some embodiments, the baffle may include one or more alignment fixtures which can hold (e.g., align or orient) the optical fibers. In this way, the baffle may serve to both align the optical fibers and direct light away from them. Specific constructions and features of stray light baffles are described in greater detail with reference to the figures below.

Stray light as used herein may refer to scattered, reflected, back scattered, back reflected, refracted, diffuse light or laser energy, as well as light at wavelengths other than those delivered by the laser energy sources propagating away or towards one or more laser energy sources. In some instances, the Inventors have appreciated that the source of stray light may also include second (and third, etc.) harmonics of the laser light, stimulated Brillouin scattering, Raman scattering, four wave mixing tones and/or other optical phenomena generated in the optical fibers, as well as any interactions of the laser light and the various components of the build volume (e.g., work surface). In some instances, heat generation in the build volume and/or any other component of the additive manufacturing system may generate light associated with spectral emission and/or black body radiation of the heated materials (e.g., at wavelengths between UV to far infrared). It should be appreciated that the stray light baffles described herein may redirect stray light from any source, as the present disclosure is not limited by the source or wavelength of the stray light.

Accordingly, in some embodiments, optical fibers may transmit laser energy from one or more laser energy sources, through one or more optical components directed to a build surface. The optical fibers may be both physically supported by and/or optically coupled to the one or more optical components. For example, in additive manufacturing embodiments which include one or more stray light baffles, the stray light baffles may serve to physical orient, position, and/or align a portion of the optical fibers, as well as optically redirecting or deflecting stray light from the fibers (e.g., backscattered light traveling toward the laser energy source). As will be described in greater detail below, the stray light baffles may physically retain a portion of optical fibers with one or more alignment fixtures.

Regarding its optical function, the stray light baffles may include one or more tapered surfaces to assist in the redirection of stray light. The tapered surface may be tapered relative to the longitudinal axis of the optical fibers (and similarly, the optical pathway of the laser energy), such that stray light may be channeled out of the fiber into the nearby environment and/or into a suitable body to limit the amount of light directed back to the laser energy source. The tapered surface, as will be described in greater detail relative to the figures, may include an angled surface with a constant slope relative to the longitudinal direction, and/or may include any suitable geometry of the tapered surface, including curved, exponential, convex, concave, stepped, monotonically decreasing, non-monotonically decreasing, and/or any other suitable geometry. It should be appreciated that any combination of materials and geometry may be used to construct the baffle to deflect or otherwise redirect light from the optical fibers. For example, the baffle may include a graded or stepped index material, which may direct light away from the optical fibers without a taper. Accordingly, the present disclosure is not limited by the geometry or material composition (including coatings) of any portion of the baffle. In some embodiments, the deflection of stray light (directed in either direction along the longitudinal axis of the fibers) may also have the added benefit of reducing the localized heating associated with accumulation of laser energy at a specific location within the optical assembly.

A stray light baffle may be formed of and/or coated with a material to enhance its optical transport properties, including, but not limited to, reflecting, absorbing, refracting, and/or scattering light transmitting along the optical fibers. The baffle may be formed of any appropriate material. In some embodiments, the material composition of the baffle may be selected to optically couple the baffle and the optical fibers. For example, the baffle may include a high index or refraction material to facilitate laser energy transfer between the two components. In some embodiments, the baffle may be formed of a material which may be transparent at the wavelength of the laser energy source. It should be appreciated that various portions of the baffle may be formed of various materials (e.g., a tapered surface coated with a reflective material, etc.), as the present disclosure is not limited to monolithic, single-material optical baffles. Any suitable material or combination of materials (e.g., in a composite or laminate fashion) may be used to form and/or coat the baffles, as the present disclosure is not limited by the material composition of the optical baffle. Appropriate optically transparent materials that may be used include, but are not limited to, glass, sapphire, diamond, combinations, composites, and laminates thereof and/or any other material optically and thermally compatible with the laser energy directed along the optical fibers. Appropriate materials that may be coated onto the optical baffle may include, but are not limited to, gold, diamond, pyrolytic materials, copper, anodized materials, Alodine, nanostructured absorbers such as Vantablack, thin film coatings with tailored reflectance/transmission bands, combinations, composites, and laminates thereof and/or any other material optically and thermally compatible with the laser energy directed along the optical fibers.

In some embodiments, other components of the additive manufacturing system (e.g., mechanical fixtures and/or alignment fixtures) may also serve an optical baffling function. They may be formed of a suitable optically compatible material (see non-limiting materials listed above) and/or structured in such a way to redirect or reduce the amount of stray light in the system.

In some embodiments, an additive manufacturing system may include a laser energy source (e.g., a plurality of laser energy sources) and an optics assembly configured to direct laser energy from the laser energy source (e.g., the plurality of laser energy sources) onto a build surface. According to some embodiments, one or more optical fibers may be coupled directly or indirectly to the one or more laser energy sources. In some embodiments, an additive manufacturing system may include one or more endcaps that are optically and physically coupled to the distal ends of one or more associated optical fibers used to provide laser energy to the additive manufacturing system. The endcaps may reduce a power area density of transmitted laser energy prior to transmission through a distal surface of the endcaps by providing an increased transmission area of the laser energy relative to a transverse cross-sectional area of the optical fibers without an endcap. The laser energy output from the endcap or endcaps may be directed onto a build surface through one or more intervening optical components of the optics assembly to form a laser energy spot on the build surface (e.g. lenses, optical fibers, galvo-scanners, lens arrays, etc.). Exposure of the laser energy to powdered material on the build surface may be used to fuse at least a portion of the powder to form a desired geometry on the build surface. In some instances, the optics assembly may be configured to form an array of laser energy spots on the build surface from the laser energy from each laser energy source. For example, the optics assembly may be configured to direct laser energy from each laser energy source to form one or more corresponding laser energy spots in the array. The array of laser spots may be a linear array, according to certain embodiments. However, the array of laser spots may be a two-dimensional array, according to certain embodiments. Additionally, additive manufacturing systems in which only a single laser energy spot is used are also contemplated as the disclosure is not limited in this fashion.

As noted above, it may be desirable to accurately locate and position one or more portions of the optical fibers and/or endcaps within a system for accurate delivery of laser energy to a build volume. Accordingly, in some embodiments, an additive manufacturing system may employ one or more alignment fixtures which may receive one or more optical fibers and/or endcaps coupled with the optical fibers. For example, the alignment fixture may define a desired spatial distribution and/or orientation of one or more portions of the optical fibers. In one such embodiment, the alignment fixture may orient each optical fiber and/or endcap to be oriented in parallel directions such that light traveling through the optical fibers and/or endcaps may exit the alignment fixture along one or more paths that are parallel to a desired transmission direction. The alignment fixture may also facilitate accurately positioning the one or more optical fibers and/or endcaps at predetermined positions relative to a length, width, and/or thickness of the alignment fixture where the width and thickness directions may be perpendicular to a length of the alignment fixture which is parallel to the longitudinal axes of the portions of the optical fibers positioned therein. In certain embodiments, an alignment fixture may include a plurality of alignment features such as v-grooves, holes, optical wedges, optical blocks, and/or any other appropriate alignment feature which the optical fibers and/or endcaps may be positioned in or engaged with to appropriately position the optical fibers and/or endcaps. Depending on the particular embodiment, the alignment features may be arranged in any suitable manner to define a desired spatial distribution (e.g., pitch) and absolute position(s) of the end portions of the optical fibers and/or endcaps held in the alignment fixture.

The alignments fixtures described herein may be made from any appropriate material or combination of materials including, for example, metals such as copper, nickel-iron alloys such as Invar, ceramics such as glass, sapphire, and diamond, and/or any other appropriate material capable of supporting the optical fibers thereon. Additionally, in some embodiments, laminates of these materials may be used. For instance, a ceramic layer may be disposed on a thicker and more thermally conductive metal layer. In either case, the overall materials and construction may be selected to provide a desired thermal conductivity and/or thermal expansion as detailed further below in some embodiments.

In some embodiments, a stray light baffle may include an alignment fixture to retain at least a portion of the optical fibers in place. In embodiments where the alignment fixture includes V-shaped grooves, each groove may correspond with a diameter of each optical fiber, to receive the fiber and limit transverse (e.g., perpendicular to the light path and longitudinal direction of the fiber) movement. In some instances, the optical fibers may be held or clamped between two grooved structures of the baffles.

As described previously, in some embodiments, the one or more mechanical fixture(s) of the additive manufacturing systems described herein may be associated with one or more alignment fixtures to help orient, align, and/or transversely fix a portion of the optical fibers and/or endcaps. For example, the one or more mechanical fixtures (e.g., resilient member(s)) may bias the optical fibers and/or endcaps against an alignment fixture. Of course, the mechanical fixtures described herein may also retain the optical fibers and/or endcaps against a flat surface and/or any other suitable alignment fixture, as the present disclosure is not so limited.

In some embodiments, one or more components (e.g., endcaps, optical fibers, one or more portions of a stray light baffle, one or more portion of the alignment fixtures, etc.) of an additive manufacturing system may be at least partially (e.g., completely) coated with an antireflective coating or other desired coating. The antireflective coating may, in some embodiments, reduce the reflection of laser energy from the surfaces on which they may be applied. The antireflective coating may be applied using sputtering, ion beam sputtering, ion beam magnetron sputtering, evaporative methods, and/or any other suitable method to apply a coating to a transparent base material. This may advantageously increase the power area density of the transmitted laser energy, while reducing undesirable reflection of laser energy towards the laser energy source. In some embodiments, antireflective coatings may include abrasive treatment of the desired surface to scatter or otherwise limit the amount of laser energy flowing in an undesirable direction. Any suitable coating and/or treatment of the various optical components described herein may be employed to limit stray light within the optical system.

It should be appreciated that any component described herein (e.g., an alignment portion of a stray light baffle, a holder associated with a resilient element, or other component) may be formed of and/or coated with a material which undergoes limited thermal expansion upon exposure to the elevated temperatures of the system. As discussed previously, thermal expansion may result in misalignment of the optical fibers and general dysfunction or damage of the system. Accordingly, the optical baffle(s), alignment fixture(s), and/or mechanical fixture(s) may be formed of or coated with a material with a low thermal expansion coefficient. For example, the low thermal expansion coefficient material may have a thermal expansion coefficient of at least $0.5\times10^{-6}$ $K^{-1}$, $1\times10^{-6}$ $K^{-1}$, $2\times10^{-6}$ $K^{-1}$, $5\times10^{-6}$ $K^{-1}$, $10\times10^{-6}$ $K^{-1}$, $15\times10^{-6}$ $K^{-1}$, $20\times10^{-6}$ $K^{-1}$, and/or any other suitable thermal expansion coefficient. In some embodiments, the low thermal expansion coefficient material may have a thermal expansion coefficient of less than or equal to $20\times10^{-6}$ $K^{-1}$, $15\times10^{-6}$ $K^{-1}$, $10\times10^{-6}$ $K^{-1}$, $5\times10^{-6}$ $K^{-1}$, $2\times10^{-6}\times10^{-6}$ $K^{-1}$, $1\times10^{-6}$ $K^{-1}$, $0.5\times10^{-6}$ $K^{-1}$, and/or any other suitable thermal expansion coefficient. Combinations of the foregoing ranges are also contemplated, including, but not limited to, a thermal expansion coefficient between $0.5\times10^{-6}$ $K^{-1}$ and $20\times10^{-6}$ $K^{-1}$. Of course, other ranges, including ranges both greater than and less than those noted above are also contemplated as the present disclosure is not so limited. While these ranges of thermal expansion coefficients are referenced to a material, it should be understood that these ranges may also apply to an overall coefficient of thermal expansion for a composite component including multiple materials as well. In some embodiments, the low thermal expansion coefficient material may have a thermal expansion coefficient lower than copper. In some embodiments, the optical baffle(s), alignment fixture(s), and/or mechanical fixture(s) may be coated with gold. In some embodiments, the low thermal expansion coefficient material may have a thermal expansion coefficient approximately the same as diamond. It should be appreciated that any suitable material or combinations of materials may be employed to form and/or coat at least a portion of the optical baffle(s), alignment fixture(s), and/or mechanical fixture(s), as the present disclosure is not so limited.

It should be appreciated that any component described herein (e.g., an alignment portion of a stray light baffle, a holder associated with a resilient element) may be formed of and/or coated with a thermally conductive material to reduce the risk of overheating (and potential melting) of the optical fibers, and to transport heat away from the fibers. Accordingly, the stray light baffle(s), alignment fixture(s), and/or mechanical fixture(s) may be formed of or coated with a material with a suitable thermal conductivity, including, but not limited to, at least 0.1 W/m K, 0.5 W/m K, 1 W/m K, 10 W/m K, 50 W/m K, 100 W/m K, 200 W/m K, 500 W/m K, 1000 W/m K, and/or any other suitable thermal conductivity. In some embodiments, the thermal conductivity of one or more components in the system may be less than or equal to 1000 W/m K, 500 W/m K, 200 W/m K, 100 W/m K, 50 W/m K, 10 W/m K, 1 W/m K, 0.5 W/m K, 0.1 W/m K, and/or any other suitable thermal conductivity. Combinations of the foregoing ranges are also contemplated, including, but not limited to, a thermal conductivity of one or more components in the system between 0.1 W/m K and 1000 W/m K. Of course, other ranges, including ranges both greater than and less than those noted above are also contemplated as the present disclosure is not so limited. In some embodiments, a component may achieve a desired thermal conductivity through a laminate arrangement of thermally conductive materials. It should be appreciated that any suitable thermally conductive material or combinations of materials may be employed to form and/or coat at least a portion of the optical baffle(s), alignment fixture(s), and/or mechanical fixture(s), as the present disclosure is not so limited.

In some embodiments, one or more portions of a mechanical fixture (e.g., a plurality of flexible fingers forming a resilient member, as will be described with respect to the figures below) may be formed of a mechanically compliant material. The mechanical fixture may be formed of any suitable material which may robustly retain the optical fibers and/or endcaps without applying excessive stress to the optical components, thereby distorting the optical signal. One or more portions of the mechanical fixture may be formed of a flexible and/or compliant material, such as one or more metals. In some embodiments, one or more structural features (e.g., cantilevers) may provide the desired resilience or compliance of the mechanical fixture. In other words, the structure of the mechanical fixture can lend itself to a resilient and/or compliant structure, even if the constituent materials are not themselves resilient and/or compliant. For example, a resilient member may include a leaf spring formed of a flexible glass material. It should be appreciated that the materials used to construct the mechanical fixture may be machinable and/or compatible with relevant manufacturing techniques. It should be appreciated that any suitable material or combinations of materials (e.g., composites, laminates) may be employed for any portion of the mechanical fixtures described herein.

As will be described in greater detail below in reference to the figures, in some embodiments, a mechanical fixture may be a clamp which may urge a portion of the optical fibers against an alignment fixture, which may include v-grooves or other alignment features. In some embodiments, the clamp may be a rigid, non-resilient body. Accordingly, the present disclosure is not limited by the resilience, flexibility, and/or compliance of the mechanical fixtures.

In some embodiments, at least one mechanical fixture and/or at least one baffle may serve to cool the optical fibers. This cooling process may counteract localized heat generation associated with transmission of high power laser energy to keep the optical fibers at a functional temperature, reduce the risk of optical beam distortion as a result of heating (e.g., physical warping of the fiber and/or surrounding optical components), and prolong the lifetime of the fibers. Accordingly, the mechanical fixture(s) and/or baffle(s) may be in thermal communication with at least one optical fiber, such that they may transport heat away from the fiber. The mechanical fixture(s) and/or baffle(s) themselves may be formed and/or coated with a thermally conductive material (e.g., metals such as gold) for optimized heat transfer.

The mechanical fixture(s) and/or baffle(s) may further be in thermal communication with a cooling system to cool the optical fibers and/or nearby elements to a desirable temperature. The cooling system may actively and/or passively transport heat away from the optical fibers through any suitable means known in the art. For example, the mechanical fixture(s) and/or baffle(s) may be in thermal communication with one or more thermoelectric coolers or forced fluid (e.g., gas or liquid) flow systems for active thermal management. In other embodiments, the mechanical fixture(s) and/or baffle(s) may be in thermal communication with, or include integrated, heat exchangers such as heat sinks for passive thermal management. The heat exchanger may include large surface areas (e.g., via fins) to maximize convection of heat away from the mechanical fixture(s) and/or baffle(s), which may cool the optical fibers. It should be appreciated that any active or passive cooling systems, including combinations of both, may be employed to cool the mechanical fixture(s) and/or baffle(s), as the present disclosure is not so limited.

In some embodiments, the mechanical fixture(s) and/or stray light baffle(s) of a system may transport heat away from the optical fibers to the surrounding environment, through convection alone. In this way, the internal atmosphere of the manufacturing system, which may be at a cooler temperature than the optical fibers transporting laser energy, may cool the fibers through the thermally conductive mechanical fixture(s) and/or baffle(s). Of course, embodiments in which the alignment fixtures serve to cool a portion of the optical fibers are also contemplated. It should be appreciated that the present disclosure is not limited by the type, arrangement, or presence of cooling systems.

The additive manufacturing systems described herein may employ one or more optical fiber connectors coupled to either one, or a plurality of, laser energy sources (e.g., of the plurality of laser energy sources and the optics assembly). For example, a first optical fiber or first plurality of optical fibers may be optically coupled to the one or more corresponding laser energy sources and extend to and be connected with the optical fiber connector. Additionally, a second optical fiber or second plurality of optical fibers may extend from the optical fiber connector to the optics assembly to which the second plurality of optical fibers may be optically coupled. An optical fiber connector may be configured such that the one or more second optical fibers may be optically coupled to a corresponding optical fiber of the one or more first optical fibers within the optical fiber connector. In this manner, laser energy from the laser energy source or plurality of laser energy sources may be transmitted via the first optical fiber or first plurality of optical fibers to the optical fiber connector, and subsequently to the optics assembly via the second optical fiber or second plurality of optical fibers such that the laser energy can be delivered to the build surface. Depending on the particular embodiment, an optical fiber connector may be connected to either a stationary or movable optics assembly. This may include, for example one, or both, of the above noted connections between the separate optical fibers and the optical fibers with the optics assembly. Thus, it should be understood that the use of the disclosed optical fibers is not limited to only specific constructions and embodiments described herein.

In the various embodiments described herein, laser energy may be generated by one or more independently controllable laser energy sources and that are operated to deliver the laser energy to the optics assembly through one or more separate optical fibers associated with the laser energy sources. It should be understood that any appropriate type of optical fiber may be used including, for example, solid-core optical fibers. However, in other embodiments, the one or more optical fibers may include fiber segments spliced together to form a single optical fiber. Alternatively or additionally, a single optical fiber path may be generated by using an optical connector to couple the ends of two fibers together.

Regardless of the specific optical fiber construction, each optical fiber optically connected to the one or more laser energy sources of an additive manufacturing system may be appropriately routed to and optically connected with the optics assembly of the additive manufacturing system. In some embodiments, the distal ends of the one or more optical fibers may be disposed on and optically coupled to an endcap which is received in a mounting fixture (e.g., a fiber holder) that ensures the endcap of the optical fiber is properly aligned. For example, if the additive manufacturing system comprises a plurality of optical fibers, the distal end portions of the optical fibers may be oriented parallel to one another and the distal ends of the endcaps may be aligned with one another at a predetermined axial position within the mounting fixture, according to certain embodiments. This may facilitate coupling of the mounting fixture and the associated optical fibers with the optics assembly of the system. Specific constructions and features for aligning the endcaps of a system are described in greater detail with reference to the figures below.

As noted above, in some embodiments, an optical fiber extends between a laser energy source (and/or a plurality of laser energy sources) and an optics assembly of an additive manufacturing system. The optical fiber may be used, according to certain embodiments, to transmit laser energy from a laser energy source along an axial dimension of the optical fiber. The optical fiber may be directly connected to the laser energy source and/or the optics assembly. For example, according to some embodiments, the optical fiber is directly connected to both the optics assembly (e.g., at a distal end of the optical fiber) and to the laser energy source (e.g., at a proximal end of the optical fiber). In some embodiments, the optical fiber is only directly connected to either the optics assembly or the laser energy source. For example, according to certain embodiments, one end of the optical fiber is connected to an optical connector and a separate optical fiber is connected to the optics assembly. Further in some embodiments, an optical fiber is directly connected to neither the laser energy source nor the optics assembly. Regardless, the optical fibers disclosed herein may be incorporated at any appropriate location between the laser energy sources and the optics assembly.

Embodiments referring to an optical fiber may be interpreted as referring to a single optical fiber, or one of a plurality of optical fibers handled in a similar fashion, according to certain embodiments. Thus, references to one or more optical fibers, an optical fiber, a single optical fiber, or other similar terminology in the various embodiments described herein should be understood to apply to both single optical fibers as well as a plurality of optical fibers as the disclosure is not so limited. In some embodiments where a plurality of optical fibers is used, the plurality of optical fibers may be aligned with corresponding predetermined positions and orientations with one or more alignment fixtures, which may correspond with mechanical fixtures described previously, or may be standalone features. For example, the optical fibers may be aligned axially such that the distal ends of the endcaps associated with the plurality of optical fibers are positioned within a predetermined range (i.e. a tolerance) of a desired axial position within the system. The optical fibers may also be aligned in one or more transverse directions relative to the axial direction of the optical fibers. For example, the optical fibers may be aligned with one another relative to a width and/or thickness direction of the optical fibers within an array arrangement of the optical fibers. The optical fibers and endcaps may be aligned in a linear array, in some embodiments. According to other embodiments, the optical fibers and endcaps may be aligned in a two-dimensional array. The alignment of the optical fibers may, according to certain embodiments, result in an advantageous arrangement of laser energy pixels, and in a preferred positioning of endcaps of the plurality of optical fibers with respect to downstream optics.

In some embodiments, the incident laser spots on a build surface may be arranged in a line with a long dimension and a short dimension, or in an array. In either case, according to some aspects, a line, or array, of incident laser energy consists of multiple individual laser energy pixels arranged adjacent to each other that can have their respective power levels individually controlled. Each laser energy pixel may be turned on or turned off independently and the power of each pixel can be independently controlled. Due to the resulting pixel-based line or array being scanned primarily perpendicular to the long axis of the line or array in some embodiments, the forward velocities and pixel power densities may be bound by approximately the same power and velocity limits as traditional single spot laser selective melting processes. However, because there are multiple spots directly adjacent to each other, the effective process rate can be approximately N times the single pixel rate, where N is the number of available pixels. Also, because each pixel can be individually turned on or off, the effective part resolution and accuracy remains comparable to a single spot system. The system can be operated as a single spot system by only turning on a single pixel, or by relying on a single optical fiber extending between a single endcap and a single laser energy source, but then the effective system rate will be substantially the same as a single spot system.

Depending on the particular embodiment, an additive manufacturing system according to the current disclosure may include any suitable number of laser energy sources. For example, in some embodiments, the number of laser energy sources may be at least 5, at least 10, at least 50, at least 100, at least 500, at least 1,000, at least 1,500, or more. In some embodiments, the number of laser energy sources may be less than 2,000, less than 1,500, less than 1,000, less than 500, less than 100, less than 50, or less than 10. Additionally, combinations of the above-noted ranges may be suitable. Ranges both greater and less than those noted above are also contemplated as the disclosure is not so limited.

Additionally, in some embodiments, a power output of a laser energy source (e.g., a laser energy source of a plurality of laser energy sources) may be between about 50 W and about 2,000 W (2 kW). For example, the power output for each laser energy source may be between about 100 W and about 1.5 kW, and/or between about 500 W and about 1 kW. Moreover, a total power output of the plurality of laser energy sources may be between about 500 W (0.5 kW) and about 4,000 kW. For example, the total power output may be between about 1 kW and about 2,000 kW, and/or between about 100 kW and about 1,000 kW. Ranges both greater and less than those noted above are also contemplated as the disclosure is not so limited.

Depending on the embodiment, an array of laser energy pixels (e.g., a line array or a two dimensional array) may have a uniform power density along one or more axes of the array including, for example, along the length dimension (i.e. the longer dimension) of a line array. In other instances, an array can have a non-uniform power density along either of the axes of the array by setting different power output levels for each pixel's associated laser energy source. Moreover, individual pixels on the exterior portions of the array can be selectively turned off or on to produce an array with a shorter length and/or width. In some embodiments, the power levels of the various pixels in an array of laser energy may be independently controlled throughout an additive manufacturing process. For example, the various pixels may be selectively turned off, on, or operated at an intermediate power level to provide a desired power density within different portions of the array.

Generally, laser energy produced by a laser energy source has a power area density. In some embodiments, the power area density of the laser energy transmitted through an optical fiber is greater than or equal to 0.1 W/micrometer$^2$, greater than or equal to 0.2 W/micrometer$^2$, greater than or equal to 0.5 W/micrometer$^2$, greater than or equal to 1 W/micrometer$^2$, greater than or equal to 1.5 W/micrometer$^2$, greater than or equal to 2 W/micrometer$^2$, or greater. In some embodiments, the power area density of the laser energy transmitted through the optical fiber is less than or equal to 3 W/micrometer$^2$, less than or equal to 2 W/micrometer$^2$, less than or equal to 1.5 W/micrometer$^2$, less than or equal to 1 W/micrometer$^2$, less than or equal to 0.5 W/micrometer$^2$, less than or equal to 0.2 W/micrometer$^2$, or less. Combinations of these ranges are possible. For example, in some embodiments, the power area density of the laser energy transmitted through the optical fiber is greater than or equal to 0.1 W/micrometer$^2$ and less than or equal to 3 W/micrometer$^2$.

The power area density of the laser energy transferred from the distal end of an optical fiber into an associated endcap may be reduced, in some embodiments, by increasing a transmission area of the transmitted laser energy within an endcap. For example, according to certain embodiments, the power area density is reduced by a factor of at least 1.1, at least 1.2, at least 1.5, at least 2, at least 2.5, at least 3, at least 4, at least 5, at least 10, or at least 15, or more within the endcap relative to the power area density within the associated optical fiber. The reduction in power area density may also be less than or equal to a factor of 50, 20, 15, 10, or 5 times less than the power area density within the associated optical fiber. In view of the above, in certain embodiments, the transmission area of the transmitted laser energy, such as a distal surface area of the endcap oriented towards one or more downstream optics, may correspondingly be increased by a factor of at least 1.1, at least 1.2, at least 1.5, at least 2, at least 2.5, at least 3, at least 4, at least 5, at least 10, or at least 15, or more within the endcap relative to a transverse cross sectional area of the associated optical fiber (e.g. a transverse cross-sectional area of a core of the optical fiber). The transmission area of the transmitted laser energy within the endcap may also be less than or equal to 50, 20, 15, 10, or 5 times greater than the transmission area (e.g. transverse cross sectional area) of the associated optical fiber. Combinations of the foregoing ranges are contemplated including, for example, a reduction in power area density within an endcap optically coupled to an optical fiber may be between or equal to 1.1 and 50 times less than or equal to the power area density within the optical fiber. Correspondingly, the transmission area within the endcap may be between or equal to 1.1 and 50 times greater than or equal to the transmission area of the associated optical fiber. Of course, ranges both greater than and less than those noted above are also contemplated as the disclosure is not so limited.

Depending on the application, output of the optics assembly may be scanned across a build surface of an additive manufacturing system in any appropriate fashion. For example, in one embodiment, one or more galvo scanners may be associated with one or more laser energy sources to scan the resulting one or more laser pixels across the build surface. Alternatively, in other embodiments, an optics assembly may include an optics head that is translated in a direction parallel to a plane of the build surface to scan the one or more laser pixels across the build surface. In either case, it should be understood that the disclosed systems and methods are not limited to any particular construction for scanning the laser energy across a build surface of the additive manufacturing system.

For the sake of clarity, transmission of laser energy through an optical fiber is described generically throughout. However, with respect to various parameters such as transverse cross-sectional area, transverse dimension, transmission area, power area density, and/or any other appropriate parameters related to a portion of an optical fiber that the laser energy is transmitted through, it should be understood that these parameters refer to either a parameter related to a bare optical fiber and/or a portion of an optical fiber that the laser energy is actively transmitted through such as an optical fiber core, or a secondary optical laser energy transmitting cladding surrounding the core. In contrast, any surrounding cladding, coatings, or other materials that do not actively transmit the laser energy may not be included in the disclosed ranges.

It should be appreciated that the additive manufacturing systems described herein may employ any suitable number, type, arrangement, and combination of laser energy sources, optical fibers, fiber bundles, optical elements (e.g., lenses, connectors, etc.), endcaps, baffles, mechanical fixture, alignment fixtures (e.g., holders), and/or any other elements. Therefore, the embodiments disclosed herein are not limited by the type, number, arrangement, or presence of one or more of the aforementioned features.

While the mechanical fixtures disclosed herein may be used to replace adhesives in certain portions of the optical system of an additive manufacturing, the use of adhesives in portions of the optical system are also contemplated. For example, adhesives used to mount and/or maintain a position and/or orientation of a component, including one or more optical fibers, within the systems may be used where the operating conditions of the system are compatible with the selected adhesive (e.g., temperatures below a rated temperature limit of the adhesive).

It should be appreciated that the present disclosure is not limited by the application of the various components described herein (e.g., stray light baffles, alignment fixtures, mechanical fixtures) in additive manufacturing systems. The components described herein may be employed in any suitable optical system to redirect stray light (e.g., with one or more stray light baffles) and/or position or align optical fibers and associated endcaps (e.g., with one or more alignment and/or mechanical fixtures). For example, linear arrays of optical systems described herein may be employed for applications related to tiled, spectral, and/or coherent beam combining for directed laser energy systems.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 2:
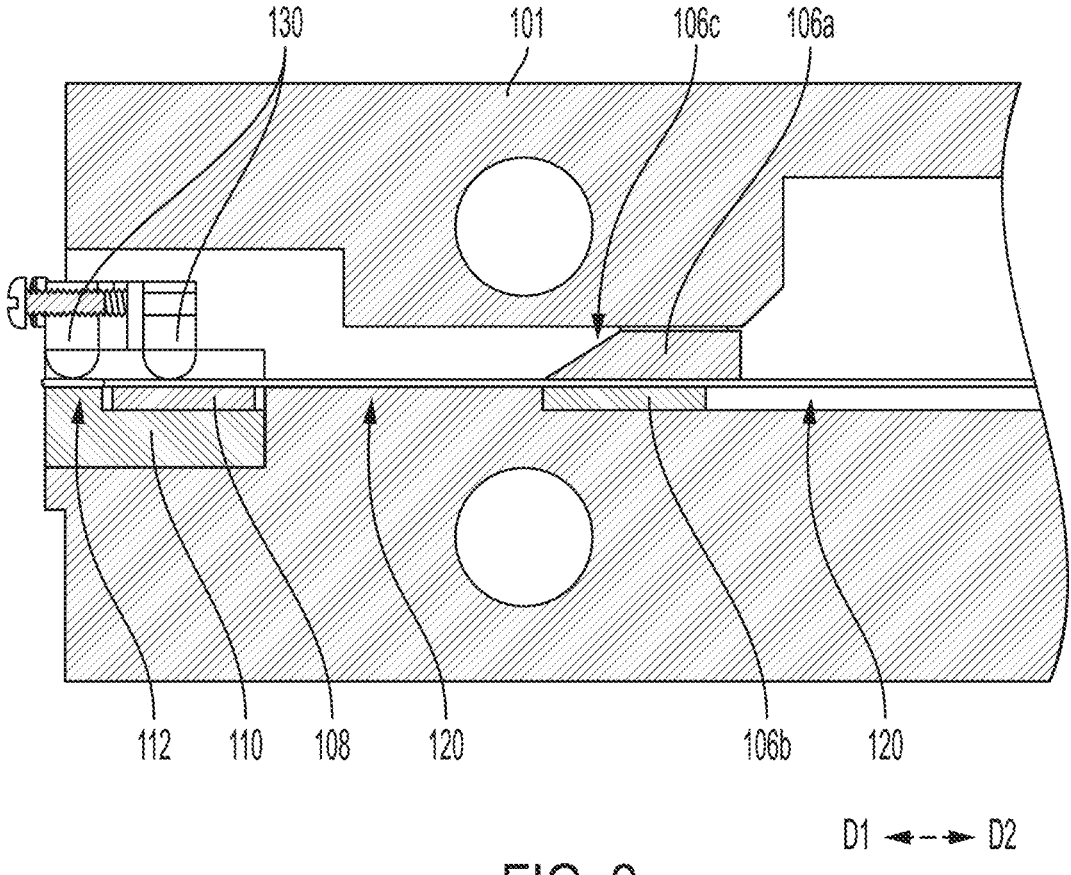
FIG. 2 shows, according to other embodiments, a schematic of a portion of a fiber optic assembly of an additive manufacturing system.

FIGS. 1-2 show, according to some embodiments, a schematic of a fiber optic assembly for an additive manufacturing system. The fiber optic assembly may include one or more optical fibers 120 which may transport laser energy from one or more laser energy sources 102 to the rest of the optical assembly of the system. For example, as shown, the optical fibers may transport laser energy to one or more endcaps 112 disposed on and optically coupled to distal end portions of the associated optical fibers, which may transmit the laser energy to a build surface 140 along a downstream direction D1. It should be understood that a number of components such as optics heads, galvo mirrors, focusing optics, and/or other optical components may be optically disposed between the illustrated endcaps and build surface. In some embodiments, the optical fibers may pass through one or more components 104 (which are represented as a single block in FIG. 1, but may represent multiple different components and/or one or more iterations of different components) which may serve to prepare or modify the optical fibers in a suitable manner. For example, components 104 may include a fiber potting region in which optical fibers are bundled together, one or more buffer stripping elements, and/or one or more cladding or mode stripping elements (which may strip one or more layers of the optical fiber with mechanical or thermal means). In some embodiments, the components 104 may serve to initially align and/or orient the optical fibers 120. In some embodiments, the components 104 may help maintain the fibers 120 in a tensioned configuration to reduce the risk of fiber damage or beam distortion. It should be appreciated that the tensioned configuration may not significantly stress or strain the fibers. In some embodiments, the components 104 include one or more connectors as described previously. It should be appreciated that any suitable components known in the art may be employed, as the present disclosure is not so limited. The various components of the assembly may be positioned in a housing 101 of the optics assembly and/or in a separate housing as the disclosure is not so limited.

After passing through a first portion of the optical fibers, laser light may subsequently flow through a portion of the one or more optical fibers optically and physically coupled to one or more stray light baffles 106. The baffles 106 may include two portions 106a, 106b, which may serve to clamp or otherwise retain a portion of the optical fibers in place between the two opposing portions of the stray light baffle. In some embodiments, the baffle 106 may include a tapered surface 106c configured to deflect or redirect stray laser light (e.g., backscattered light) away from the optical fibers. For example, as described previously, the tapered surface may expand outwards from the one or more optical fibers in an upstream direction such that a transverse dimension, such as a width and/or thickness, of the stray light baffle may be greater for an upstream portion of the stray light baffle as compared to a downstream portion of the stray light baffle. In either case, when laser light is reflected or back scattered towards the laser energy sources 102 along a second direction D2, the tapered surface 106c of the baffle 106 may be angled relative to the longitudinal axis of the optical fibers or otherwise shaped, to redirect the stray light away from the optical fibers and laser energy sources. It should be appreciated that while both portions 106a, 106b are shown to include a tapered surface 106c in FIG. 1, in some embodiments, represented by FIG. 2, only one portion of the baffle may include a tapered surface. Furthermore, a multi-portion baffle to deflect stray light, comprised of multiple bodies, one or more of which may include tapered surfaces, as well as single portion, monolithic baffles, are also contemplated. As described previously, in some embodiments, the baffle 106 may be in thermal communication with a cooling system 107a, or may include a cooling system such as a heat exchanger formed therein, to locally cool the portion of the optical fibers located adjacent to and/or extending through the baffle.

After passing through the portions of the one or more optical fibers associated with the stray light baffles 106, the laser light may be transmitted through the optical fibers 120 to one or more endcaps 112 optically coupled to and disposed on a distal end portion of the one or more optical fibers. Again, the endcaps and/or optical fibers may be optically coupled to one or more optical elements to transfer light to a build surface 140. The optical fibers 120 may be aligned and/or oriented in one or more corresponding predetermined directions and positions when positioned in one or more alignment fixtures 108, and the one or more endcaps 112 may be aligned and/or oriented in one or more corresponding predetermined directions and positions when positioned in one or more corresponding alignment fixtures 110. In some embodiments, the alignment fixtures 108, 110 may include at least one surface 108a, 110a which may include alignment features (e.g., V-shaped grooves) running parallel along a longitudinal direction of the optical fiber 120. For example, the v-grooves of the fixtures 108, 110 may be parallel to the direction D1 shown in FIGS. 1-2. The v-grooved surfaces 108*a*, 110*a* may serve to orient the optical fibers and endcaps respectively, relative to one another and/or to the remainder of the assembly. It should be appreciated that the alignment fixture 110 associated with the endcaps, or alternatively with a distal end portion of the optical fibers, may be designed with tighter geometric (e.g., pitch, groove depth, etc.) tolerances than the alignment fixture 108 to ensure accurate alignment of the endcaps and distal end portions of the optical fibers with corresponding predetermined positions. For example, the higher tolerance of the alignment fixture 110 may be used to register the endcaps 112 and distal portions of the optical fibers with one or more optics system of the additive manufacturing system, associated with transferring laser energy to the build surface. Of course, embodiments in which alignment fixtures 108 and 110 are fabricated with the same level of tolerance relative to their geometry are also contemplated. In some embodiments, alignment fixtures may be formed as a mono-lithic body, rather than the two portion arrangement depicted in FIG. 1.

As described previously, the additive manufacturing systems of the present disclosure may include one or more mechanical fixtures to help retain at least a portion of the optical fibers aligned and/or positionally fixed relative to the system. In some embodiments, the mechanical fixtures may include one or more resilient members 130*a*, 130*b*. FIG. 1 shows at least one resilient member 130*a* which may apply a bias force to the optical fibers 120 that biases the optical fibers towards the underlying alignment fixture 108 with the optical fibers disposed between the alignment fixture and the at least one resilient member to retain the optical fiber in the alignment fixture 108. Correspondingly, at least one resilient member 130*b* may be configured to apply a bias force to the endcaps 112 directed towards the, or a distal portion of the optical fibers in the absence of the endcaps, to retain the endcaps in the alignment fixture 110 with the optical fibers disposed between the alignment fixture and the at least one resilient member. As described previously, in some embodi-ments, the one or more resilient members may be thermally conductive and may be in thermal communication with a cooling system 107*b* to locally cool the portion of the optical fibers located in the baffle.

It should be appreciated that any of the features described herein to have optional cooling properties (e.g., through active and/or passive cooling) may include one or more integrated cooling microchannels for cooling with a flowing fluid. For example, the cooling systems 107*a*, 107*b*, align-ment fixtures 108, 110, and/or any other component in the additive manufacturing system may include features to cool the optical fibers and/or endcaps.

In some embodiments, a mechanical fixture akin to resil-ient members 130*a*, 130*b* shown in FIGS. 1-2 may be employed as part of a stray light baffle assembly. For example, a stray light baffle may include a first body with a tapered surface, shaped to deflect stray light away from the optical fibers, and a resilient member arranged to apply a bias to the optical fiber to urge the fiber into contact with the first body. In this way, the resilient member may serve to positionally fix at least a portion of the optical fiber against the baffle for effective optical coupling. Any of the mechani-cal fixture embodiments described herein may be used to positionally fix a portion of the optical fiber at any suitable location along the length of the optical fibers and/or endcaps.

It should be appreciated that in some embodiments, more than two resilient members may be employed to fix any desired number of portions of the optical fibers and/or endcaps in a desired position as the present disclosure is not limited by the arrangement or number of mechanical fix-tures. In some embodiments, the baffle 106 may include a mechanical fixture configured to orient or positionally fix at least a portion of the optical fibers. It should be appreciated that FIG. 1 depicts a side-view schematic of a fiber optic assembly, and that more than one of any of the depicted components may be employed along the axis normal to the plane of the schematic.

The optical assemblies described herein are not limited by the arrangement of elements depicted in any of the figures. The optical assemblies may include one or more of the various elements, in any suitable arrangement or orientation. For example, although a single stray light baffle 106 is shown to be downstream of the optical elements 104 and upstream of the alignment fixtures 108, 110 in FIGS. 1-2, embodiments in which more than one stray light baffle is positioned at various locations along the optical system (e.g., downstream of the endcaps 112) are also contem-plated.

Figure 3:
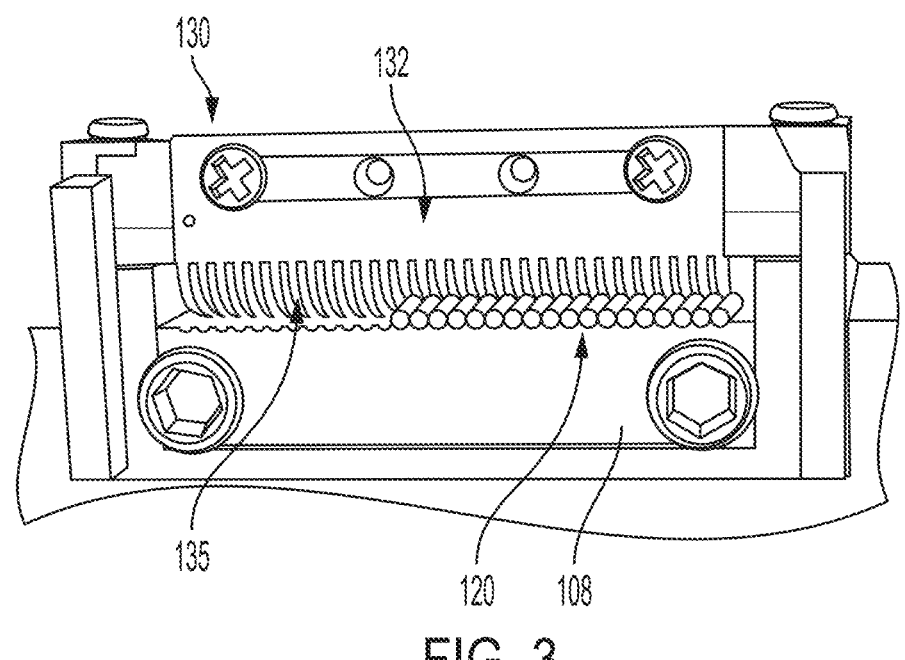
FIG. 3 shows, according to some embodiments, an orthographic view of a mechanical fixture.
Figure 4:
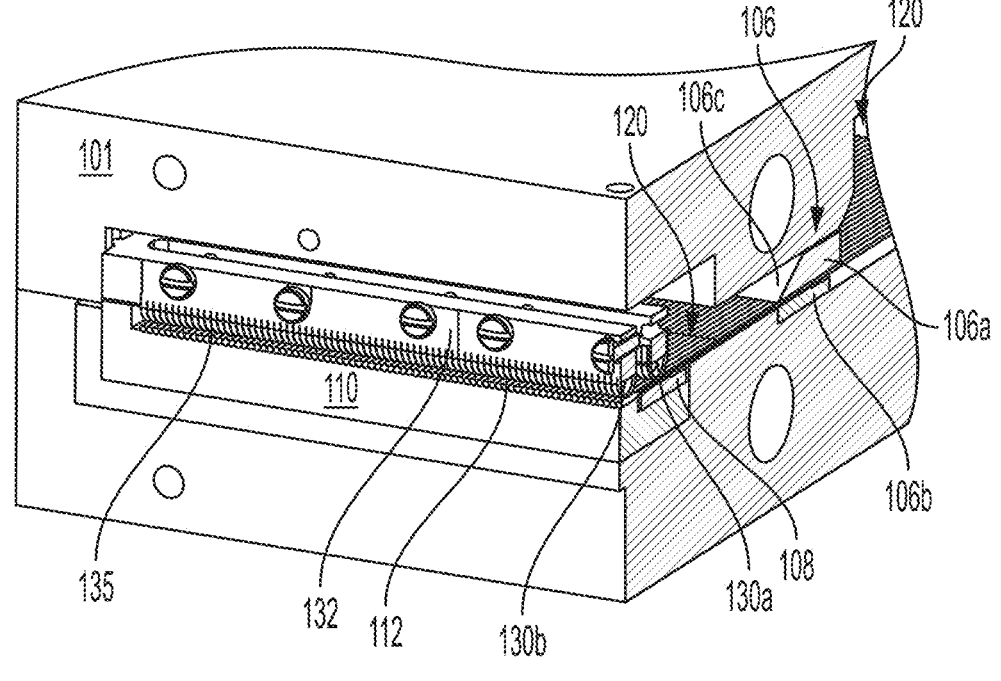
FIG. 4 shows, according to some embodiments, a partial orthographic view of the fiber optic assembly of FIG. 2.

FIGS. 3-4 depict orthographic views of a portion of an optical system of an additive manufacturing system employ-ing mechanical fixtures. FIG. 3 shows an array of optical fibers 120 routed through a mechanical fixture including one or more alignment fixtures 108 and 110 associated with the optical fibers 120 and endcaps 112 respectively. Similar to the above embodiments, the optical fiber alignment fixture may be engaged with an upstream portion of the optical fibers relative to an alignment portion of the endcap align-ment fixture. Additionally, the optical fiber alignment fixture may be disposed on and connected to a portion of a recessed portion of the endcap alignment fixture such that the endcaps and optical fibers are supported in a desired configuration. However, embodiments in which a monolithic fixture, spaced apart fixtures, or separately supported fixtures are used are also contemplated. In either case, resilient members 130*a* and 130*b* aligned with the corresponding fixture may be configured to help positionally fix the optical fibers 120 and endcaps 112 within the fixtures. In some embodiments, the resilient members may include one or more fingers 135 extending from a substrate 132. The fingers 135 may extend from the substrate 132 such that each finger may be con-figured to retain one or more optical fibers independently. In other words, if there is geometric variation (e.g., difference in diameter) along the array of optical fibers 120, the plurality of fingers 135 may function to ensure each fiber is fixed relative to a corresponding portion of an alignment fixture. In some embodiments, each finger 135 may be arranged to bias a single optical fiber or endcap towards an underlying portion of an alignment fixture to fix the position of the optical fiber or endcap relative to the alignment fixture. However, in other embodiments, each finger 135 may serve to bias or fix more than one optical fiber or endcap. The resilient member may be provided in any appropriate form including a leaf spring, spring-loaded pistons, multiple curved fingers, a monolithic compliant or deformable material extending across a width of the fixture (e.g., a thin silver wire), thin curved structures such as the illustrated curved fingers, and/or any other appropriate struc-ture capable of applying a biasing force to hold the one or more optical fibers or endcaps in contact with the corre-sponding alignment features of an alignment fixture. In some embodiments, the fingers 135 or other resilient mem-ber may be curved in a direction aligned with a longitudinal axis of the optical fibers to facilitate placement/replacement of the optical fibers, while reducing the risk of scratching or otherwise damaging the fibers.

In some embodiments, the fingers and substrate they extend from may be formed from a single sheet of material, with the fingers machined or manufactured from the sheet. In other embodiments, a plurality of fingers may be attached or coupled to a separately formed substrate. Furthermore, although fingers 135 are shown to be substantially rectangular in shape in FIGS. 3-4, embodiments with non-rectangular fingers (e.g., curved, tapered, stepped, etc.) are also contemplated. Thus, it should be appreciated that the present disclosure is not limited by the constructions, arrangement, or shape of the mechanical fixture (e.g., resilient member 130 of FIGS. 3-4).

In some embodiments, the fingers 135 (and/or any other mechanical fixture) may maintain a plurality of optical fibers 120 and/or endcaps 112 biased against an alignment fixture (e.g., fixture 108 or 110) within a predetermined spatial tolerance for the separate predetermined positions of the optical fibers and/or endcaps to help ensure optical alignment of these components with other downstream optical components of the optical assembly regardless of the innate manufacturing variability in the diameters of the fibers/endcaps. For example, the mechanical fixtures described herein may serve to maintain the predetermined positions of an array of optical fibers and/or endcaps along the transverse direction T1-T2 perpendicular to the longitudinal direction of the optical fibers, and which may have a transverse dimension of 75 mm or other appropriate dimension. The desired positioning of the optical fibers and/or endcaps within the fixture along the transverse direction and/or a vertical direction perpendicular to both the transverse direction and longitudinal direction (D1-D2) may have a tolerance of less than 10 μm, less than 5 μm, or any other desired tolerancing. Of course, other tolerances are also contemplated, dependent upon the arrangement of the optical fibers, variability in fiber/endcap diameter, operational conditions, and/or any other parameter of the optical system.

As shown in FIG. 4, more than one resilient member 130a, 130b may be employed to bias or otherwise retain optical fibers 120 or endcaps 112 against any alignment feature of an alignment fixture. For example, as described previously, a first resilient member 130a may bias at least a portion of optical fibers 120 against an alignment fixture 108 and/or a second resilient member 130b may bias at least a portion of endcaps 112 against alignment fixture 110. However, as noted previously, the present disclosure is not limited by the number or arrangement of resilient members (or other mechanical fixtures) employed as any number of alignment fixtures and corresponding resilient members may be used at any number of different locations along a length of the optical fibers between the laser energy sources and the corresponding endcaps.

Figures 5A, 5B:
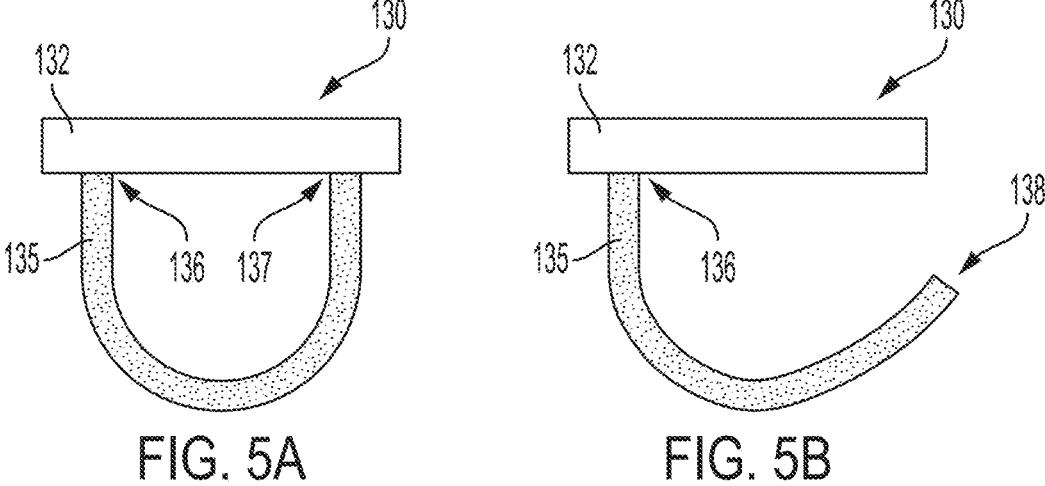
FIGS. 5A-5C show, according to other embodiments, schematics of various embodiments of mechanical fixtures.
Figure 5C:
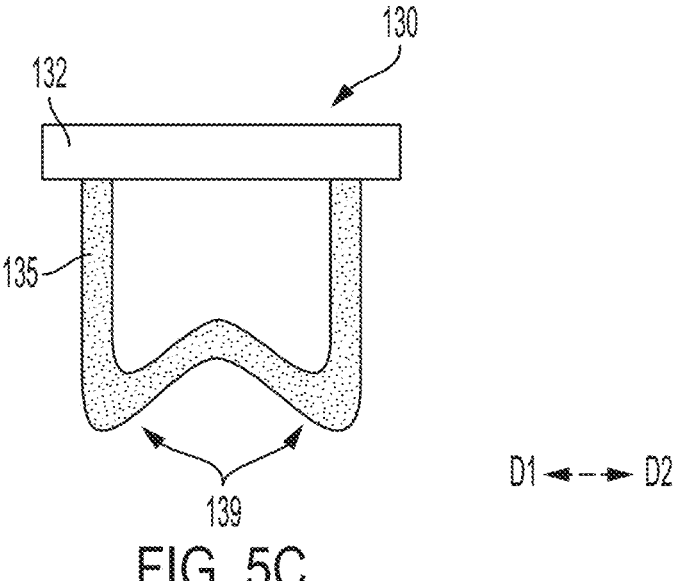

FIGS. 5A-5C depict side-views of exemplary embodiments of a resilient member 130 including fingers 135 extending from or otherwise coupled to a substrate 132. In some embodiments, the fingers 135 may be connected to the substrate at two locations 136, 137, as shown in FIG. 5A, such that the fingers 135 may be doubly clamped or connected to the substrate 132. In other embodiments, the fingers 135 may be connected to the substrate at a single location, as shown in FIG. 5B, such that an end portion 138 of the fingers 135 may be suspended from the substrate. FIG. 5C depicts a finger 135 connected on either end to the substrate with one or more curved features 139 disposed along a length of the finger and configured to engage with the optical fibers and/or endcaps. These curved features may serve to enhance or otherwise control the stiffness (e.g., spring constant) of the fingers 135. Embodiments with fingers only connected at one end to the substrate (e.g., only at a location 136) with one or more curved features 139 are also contemplated. It should be appreciated that any suitable arrangement of fingers relative to the substrate may be employed to achieve desirable stiffness (to retain the optical fibers in place) without the risk of damaging or otherwise warping the optical fibers. Additionally, while a separate substrate and finger are shown in FIGS. 5A-5C, monolithically formed fingers and substrates (e.g., fingers cut from and deformed out of plane of an elastic sheet material) are also contemplated.

While the majority of embodiments are directed to spring like fingers, it should be appreciated that any suitable resilient member may be employed to retain the associated optical fibers and/or endcaps against the alignment features of an alignment fixture (e.g., against v-grooves formed in an alignment fixture). For example, as previously described, one or more plungers, each associated with one or more optical fibers or endcaps, may be used to bias or otherwise urge the fibers and/or endcaps against the alignment fixture. Alternatively, a resilient wire or cable may extend along the transverse direction (see T1-T2 in FIG. 4), to apply a biasing force to the one or more optical fibers, urging them against the alignment fixture. In some embodiments, a coiled spring-like structure may be employed to retain the optical fibers and/or endcaps. It should be appreciated that non-coiled spring structures, which may be sufficiently compliant to accommodate a range of fiber/endcap diameters, but also sufficiently stiff to retain the optical fibers and/or caps may also be employed. In some embodiments, a compliant or deformable material may be employed. For example, a solid porous and/or sponge-like body, which has appreciable compressibility with sufficient stiffness, may be employed. Of course, any other suitable arrangement or construction, including combinations of the exemplary embodiments of resilient members described herein may be employed to retain the optical fibers and/or endcaps in a desired orientations and/or position.

Figure 6:
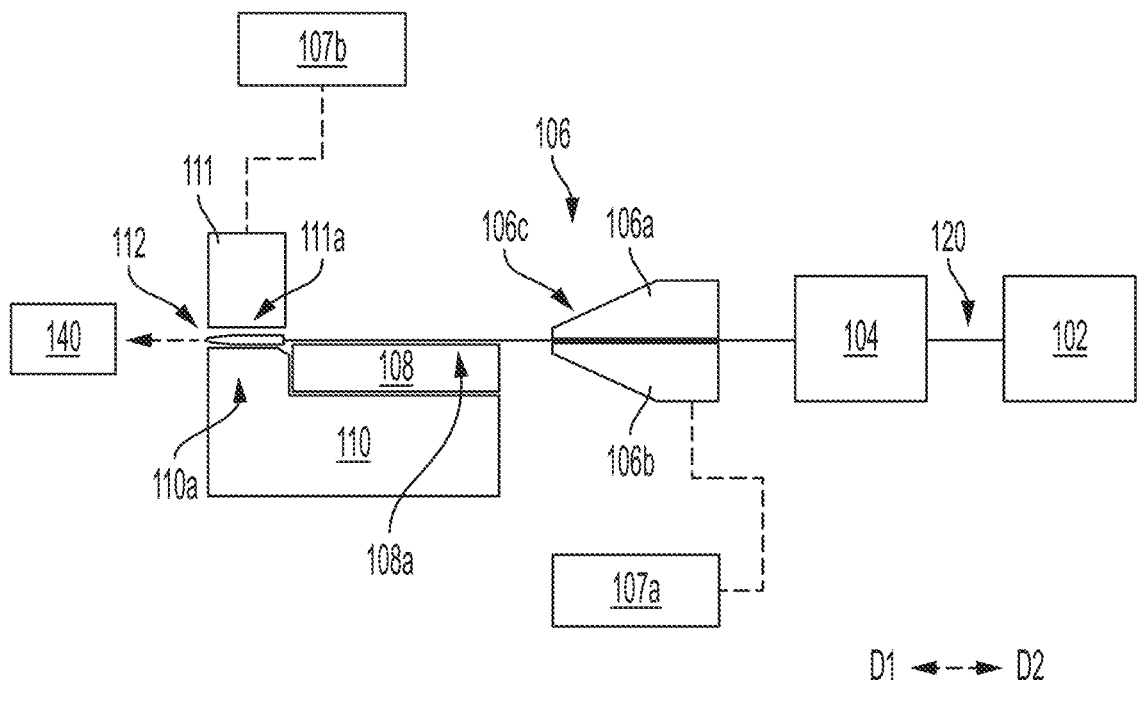
FIG. 6 shows, according to other embodiments still, a schematic of a portion of a fiber optic assembly of an additive manufacturing system.
Figure 7:
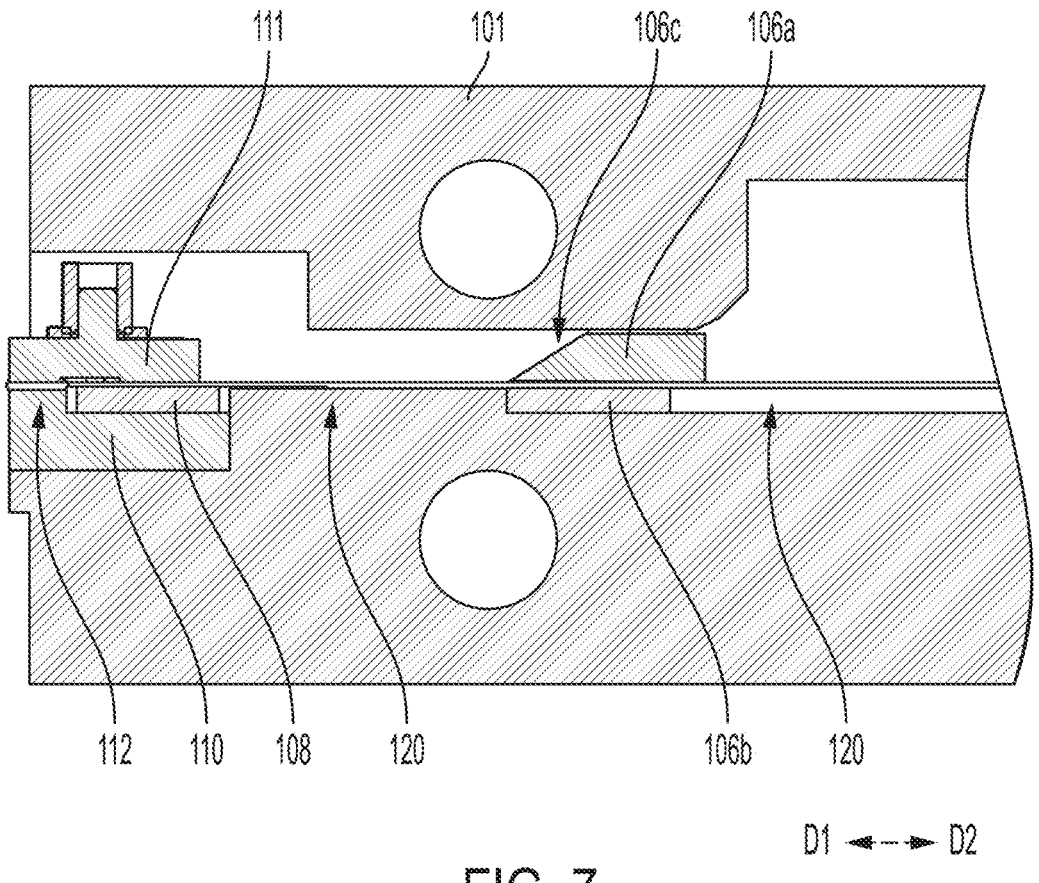
FIG. 7 shows, according to other embodiments still, a schematic of a portion of a fiber optic assembly of an additive manufacturing system.
Figure 8:
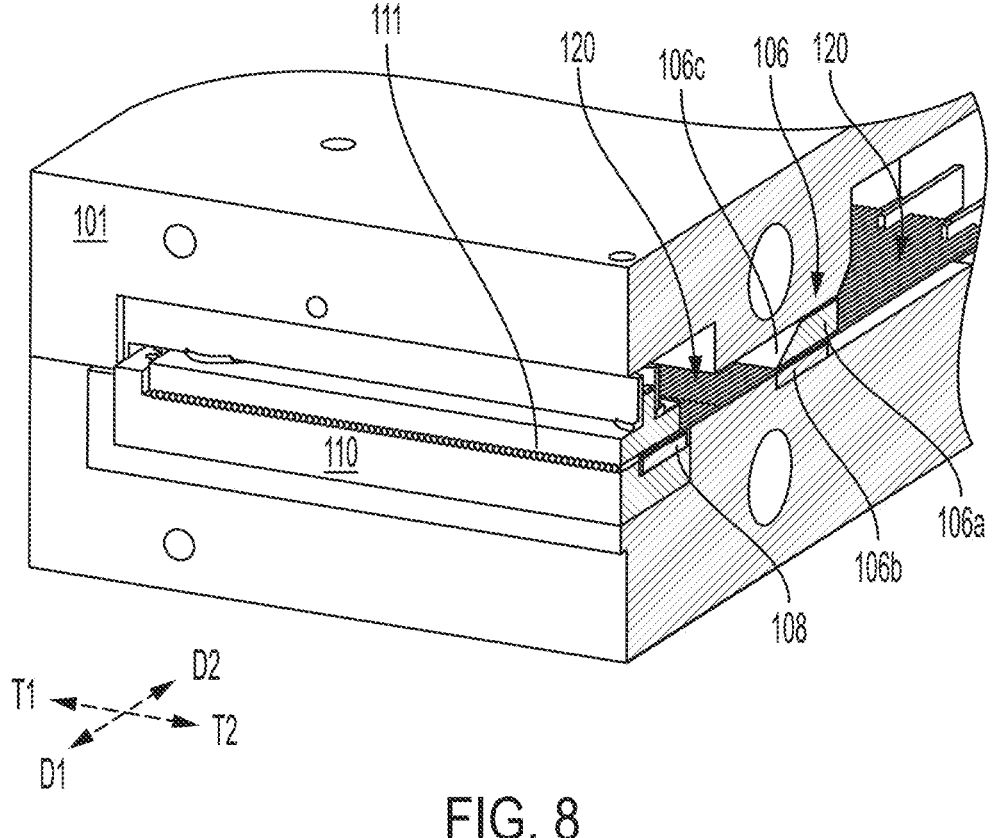
FIG. 8 shows, according to some embodiments, a partial orthographic view of the fiber optic assembly of FIG. 7.

FIGS. 6-8 depict an optical system similar to the one depicted and described in FIGS. 1-4, including a different mechanical fixture. The optical system may route laser energy from one or more laser energy sources 102 through one or more optical fibers 120 to endcaps 112, which may direct the energy toward a build surface 140. The optical system may employ a stray light baffle 106 similar to one described with reference to FIGS. 1-4, but may instead employ a mechanical clamp 111. The clamp 111 may include at least one surface 111a (as shown in FIG. 6) configured to be clamped down on the optical fibers and/or endcaps to apply a biasing force towards the alignment features 110a formed in the corresponding portions of the one or more associated alignment fixtures 110. In some embodiments, the mechanical clamp may include one or more alignment features such as v-grooves formed therein that are aligned with the corresponding alignment features formed in the alignment fixture. However, embodiments in which a flat, or different shaped, clamping structure are used are also contemplated. Regardless of the specific shape of the surface engaged with the optical fibers and/or endcaps, the clamp 111 may be urged or clamped against the alignment fixtures 108, 110 to retain a portion of the optical fibers 120 and endcaps 112, respectively.

Figure 9:
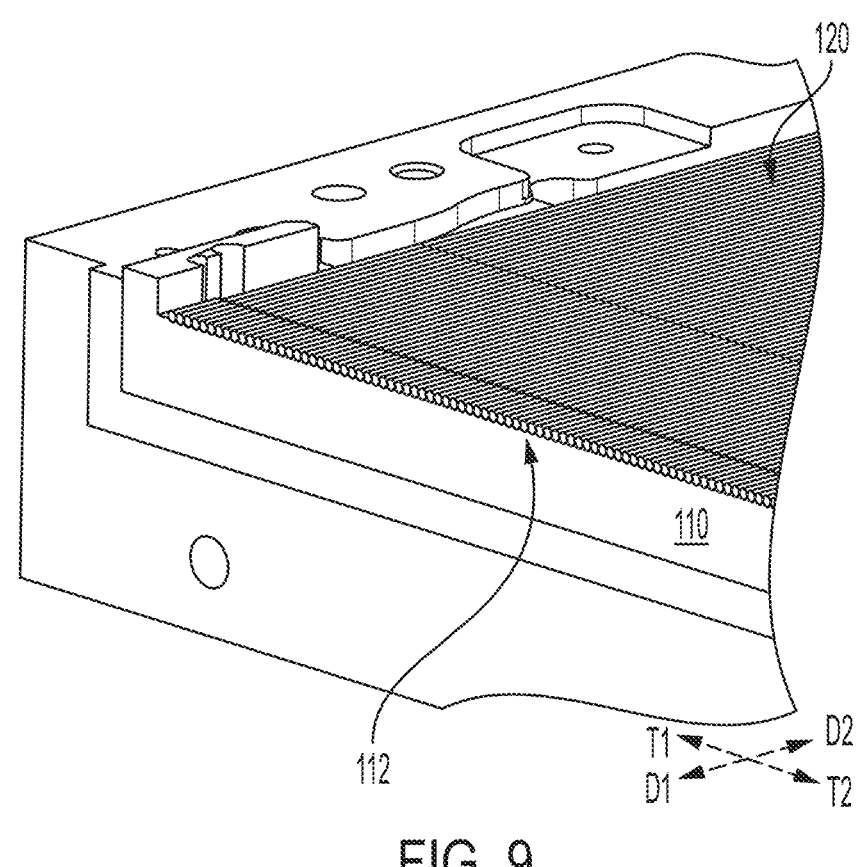
FIG. 9 shows, according to some embodiments, a partial orthographic view of an alignment fixture of a portion of a fiber optic assembly.

FIG. 9 shows a partial isometric view of an optical system with its mechanical fixture (e.g., resilient member 130 of FIG. 3 and clamp 111 of FIG. 8) removed for clarity. The figure depicts an alignment fixture 110 for aligning, spatially distributing, and/or orienting endcaps 112. The alignment fixture 108 shown in prior figures for aligning, spatially distributing, and/or orienting the optical fibers upstream from the endcaps is not visible in this view. As shown in the figure, in some embodiments, the endcaps 112 may have a greater transverse dimension (see direction T1-T2 of FIG. 9), e.g. a diameter, as compared to the optical fibers 120. As such, the alignment features (e.g., v-grooves or other appropriately shaped features) of the alignment fixtures 110 may be suitably designed to retain a portion of the desired component (optical fiber and/or endcap). As noted previously, in some embodiments, an optical system may employ at least one alignment fixture with parallel alignment features (e.g., v-grooves) configured to align both a portion of the optical fiber and a portion of the endcaps in one or more desired directions, and in some embodiments an absolute position of the optical fibers and/or endcaps relative to the alignment fixture.

Figure 10:
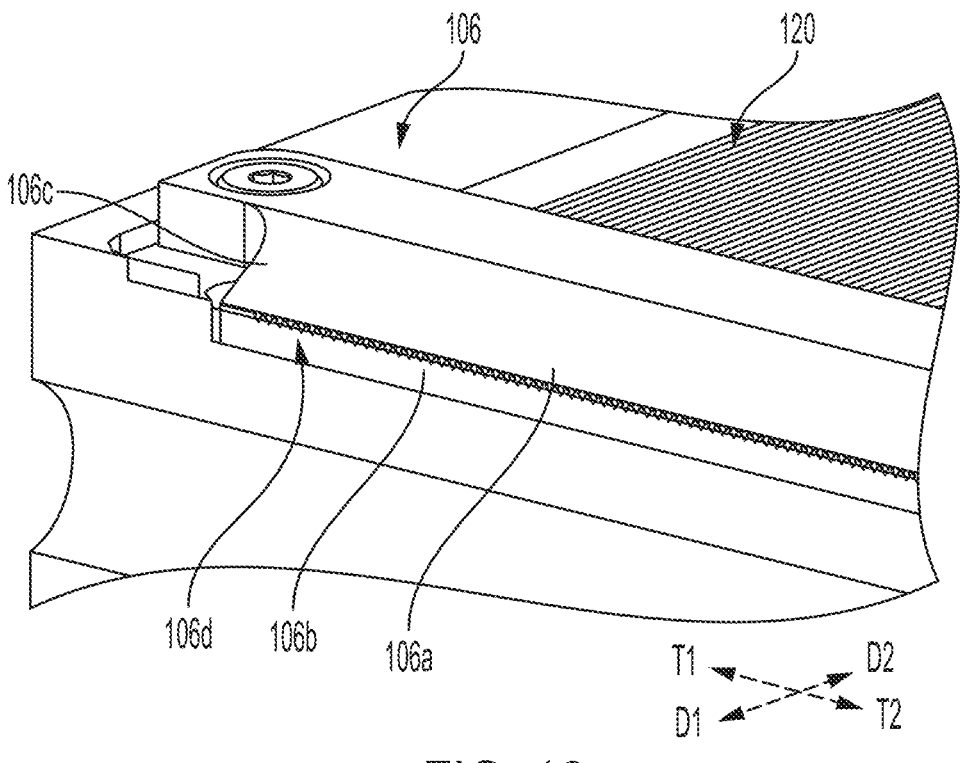
FIG. 10 shows, according to some embodiments, a partial orthographic view of an optical baffle in a fiber optic assembly.
Figure 11A:
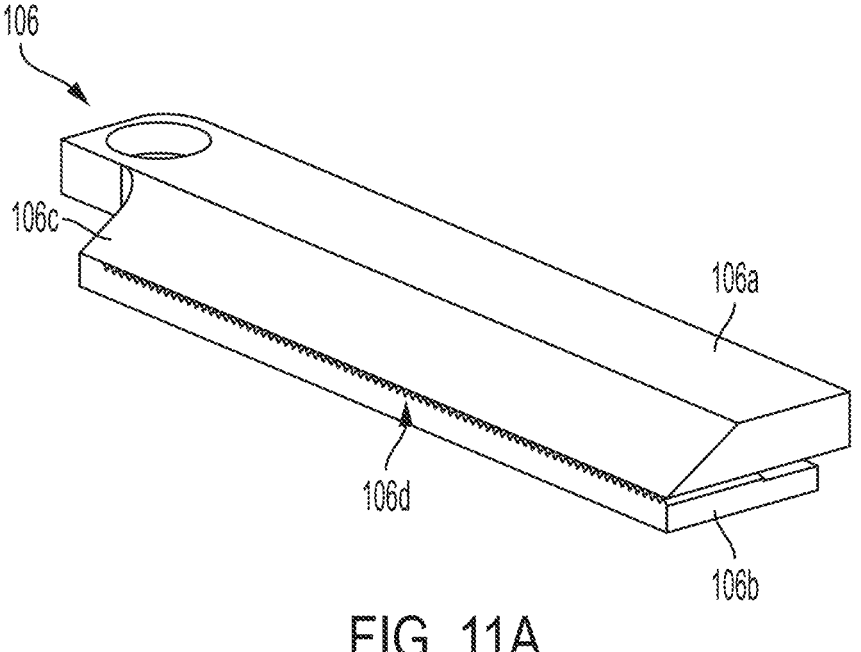
FIGS. 11A-11B show, according to some embodiments, various isolated views of the optical baffle of FIG. 10.
Figure 11B:
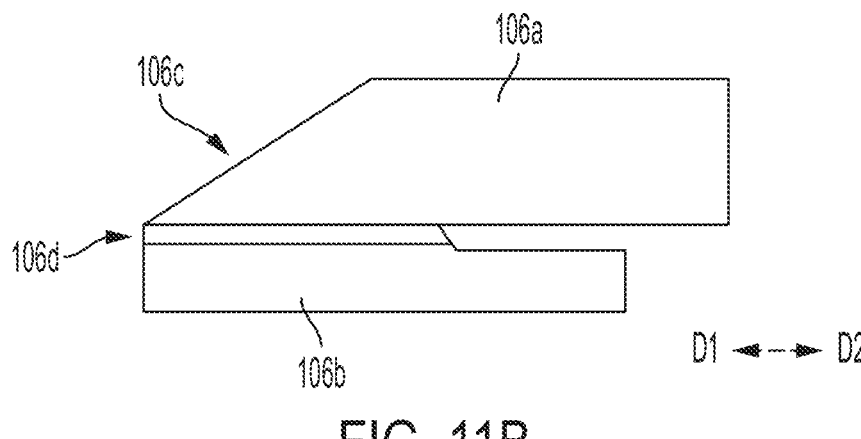

FIGS. 10-11B show various views of a stray light baffle 106. FIG. 10 shows the baffle 106 in an optical system, retaining one or more optical fibers 120 extending through the baffle. In some embodiments, the baffle may include one or more portions 106a, 106b. As shown in the figures, at least one portion of the baffle 106 may include alignment features (e.g., v-grooves 106d) for retaining the optical fibers in a desired arrangement relative to a transverse (see direction T1-T2 in FIG. 10) direction and/or vertical direction of the baffle. The alignment features may extend along the longitudinal (see direction D1-D2 in FIG. 10) direction of the baffle parallel to the one or more optical fibers extending through the baffle.

It should be appreciated that although a plurality of optical fibers 120 are shown to be received by a single optical baffle 106 in FIG. 10. However, embodiments in which multiple optical baffles are employed for a plurality of separate groups of optical fibers are also contemplated. Additionally, the use of an optical baffle with a single optical fiber is also contemplated, as the present disclosure is not limited by the number of optical fibers received by each optical baffle.

At least one portion of the optical baffle may include one or more tapered surfaces 106c that expand in a transverse dimension in an upstream direction relative to the longitudinal direction of the optical fibers (see FIG. 11B). It should be appreciated that although the tapered surface 106c is depicted to be an angled surface relative to the longitudinal axis of the optical fibers with a constant slope relative to the longitudinal direction, any suitable geometry of the tapered surface, including curved, exponential, convex, concave, stepped, monotonically decreasing, non-monotonically decreasing, and/or any other suitable geometry may be employed. It should be appreciated that any combination of materials and geometry may be used to construct the baffle to deflect or otherwise redirect light from the optical fibers. For example, the baffle may include a graded or stepped index material, which may direct light away from the optical fibers without a taper. Accordingly, the present disclosure is not limited by the geometry or material composition (including coatings) of any portion of the baffle. In some embodiments, more than one portion of the baffle may include a tapered surface (see, for example, FIG. 1).

As best seen in FIG. 11B, the two opposing portions of the stray light baffle 106 may include two opposing portions 106a and 106b between which the one or more optical fibers may be disposed. The tapered surface 106c which may be angled in an upstream direction may be formed in at least the first portion of the baffle 106a. The first portion of the baffle may also include an upstream section that includes a constant thickness. Additionally, in instances where multiple optical fibers are retained in the baffle, the overall portions of the baffle and illustrated surfaces may be planar or curved elongated surfaces extending across a width of the combined array of optical fibers such that the different portions of the stray light baffle made include prismatic cylinders with a desired cross-sectional shape. As illustrated in figures, the second portion of the stray light baffle may not include a tapered surface. Instead, the second portion may include an external surface that is approximately parallel to a longitudinal axis of the optical fibers passing through the baffle when positioned therein. However, instances in which the exterior surface of the second portion of the baffle includes a tapered, or other appropriately shaped, external surface are also contemplated. As noted previously, either the first and/or second portions of the stray light baffle may include one or more alignment features 106d sized and shaped to maintain a position of the optical fibers passing through the baffle. The first and second portions of the baffle may be maintained in a desired configuration with the optical fibers disposed therebetween using any appropriate type of connection including, but not limited to, clamps, threaded fasteners, adhesives, resilient members, and/or any other method of maintaining the different portions of the stray light baffle in a desired configuration.

In some embodiments, the stray light baffles may be in direct contact with an unshielded portion of the optical fibers. Due to the stray light baffle being made from an optically transparent material for the wavelengths of light emitted by the associated laser energy sources, stray light emitted by the optical fibers may be transmitted into an interior of the stray light baffle. The stray light may be redirected due to differences in the index of refraction of the material of the stray light baffle relative to the optical fibers and/or the stray light may be reflected off one of the external surfaces of the stray light baffle, such as the tapered surface 106c. This may help to redirect stray light away from an optical path of the system extending through the optical fibers, including redirecting the stray light away from the associated laser energy sources. As noted previously, in some embodiments, one or more surfaces of the stray light baffle, including external surfaces such as the tapered surface of the stray light baffle, may be coated with a reflective, absorbing, or other appropriate type of coating.

Figure 12A:
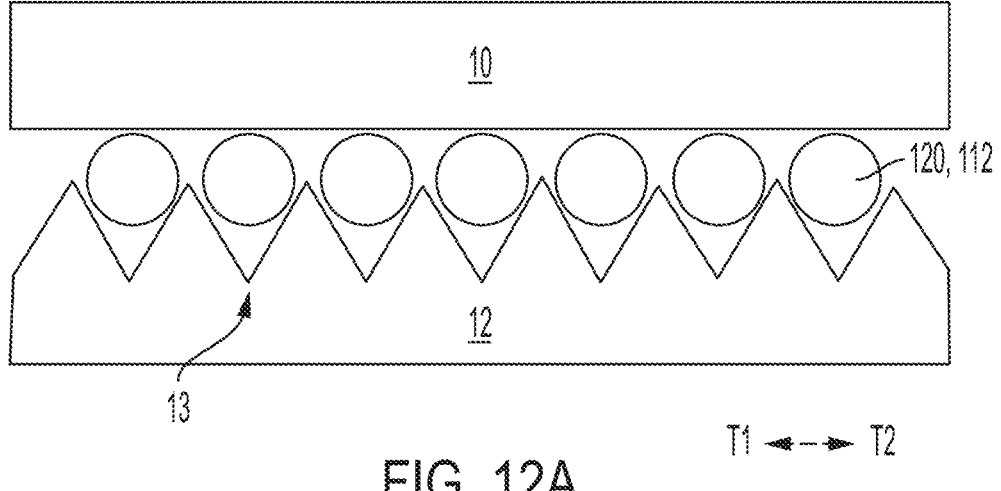
FIGS. 12A-12B show, according to some embodiments, front views of alignment features of a fiber optic assembly.
Figure 12B:
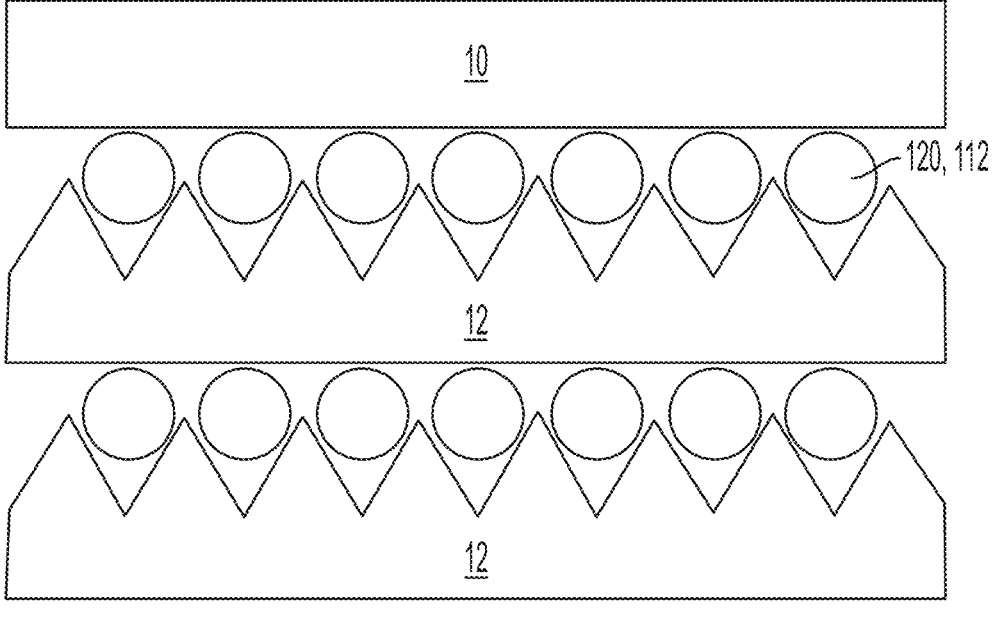

FIGS. 12A-12B depict a front view of one embodiment of alignment features which may be employed in any suitable component of an optical system, including, but not limited to one or more portions of a stray light baffle (e.g., portion 106a and 106b in FIGS. 11A-11B), and/or one or more alignment fixtures (e.g., alignment fixtures 108 and 110 in FIGS. 1 and 6, clamp surface 111a in FIGS. 6-8). The alignment features may be v-grooves 13, as shown in FIGS. 12A-12B to help retain optical fibers 120 or endcaps 112, which may have circular or rounded cross-sections taken along a transverse direction T1-T2, and reduce the risk of transverse movement, which may reduce the accuracy of the optical system and result in system dysfunction or damage. In some embodiments, the v-grooves 13 may be sized and spaced (e.g., width, depth, pitch) to accommodate a specific size of optical fiber 120 and/or endcap 112. In some embodiments, as shown in FIG. 12A, a linear array of fibers 120 and/or endcaps 112 may be clamped between two components 10, 12, at least one of which may include alignment features (v-grooves 13). It should be appreciated that embodiments in which both component 10, 12 include alignment features (the same or different) are also contemplated. In other embodiments, a two-dimensional array of fibers 120 and/or endcaps 112 may be clamped between two layers of components 12. This layered arrangement may be continued for any number of layers to provide a desired number of rows in a two-dimensional array. In the above embodiments, the optical fibers 120 and/or endcaps 112 may be aligned in any suitable orientation and/or position within an alignment fixture. For example, the endcaps of the linear array of FIG. 12A may be regularly spaced or irregularly spaced depending on the desired application. Similarly, the two-dimensional array of FIG. 12B may include multiple regularly and/or irregularly spaced optical fibers and/or endcaps. The two-dimensional array may have any appropriate configuration. For example, the two-dimensional array may be a square array, a rectangular array, a hexagonal array, a monoclinic array, and/or any other appropriate layout. It should be appreciated that FIGS. 12A-12B schematically depict alignment features, and that embodiments employing more complex features (e.g., rounded corners, holes, etc.) for any suitable number and arrangement of optical fibers and/or endcaps are also contemplated, as the present disclosure is not so limited. The various components of the alignment fixtures and/or portions of baffles may be coupled to one another in any appropriate fashion including, but not limited to, adhesives, fasteners, mechanically interlocking features, welds, and/or any other appropriate type of connection. Additionally, the depicted components as well as the end caps and/or optical fibers may be biased together using one or more resilient members as described herein.

In the above embodiment, the use of V-grooves is illustrated. However, any appropriate type of alignment feature, including alignment features with different sizes and/or shape to accommodate different sized and/or shaped endcaps or optical fibers are also contemplated as previously described.

FIGS. 13A-13G depict perspective illustrations of exemplary endcaps with different shapes that may be coupled to optical fibers for use in an additive manufacturing system, according to certain embodiments. However, it should be understood that endcaps with any appropriate size and/or shape to provide the desired reduced power area density for laser energy transmission may be used as the disclosure is not limited in this fashion.

Figures 13A, 13B, 13C, 13D, 13E:
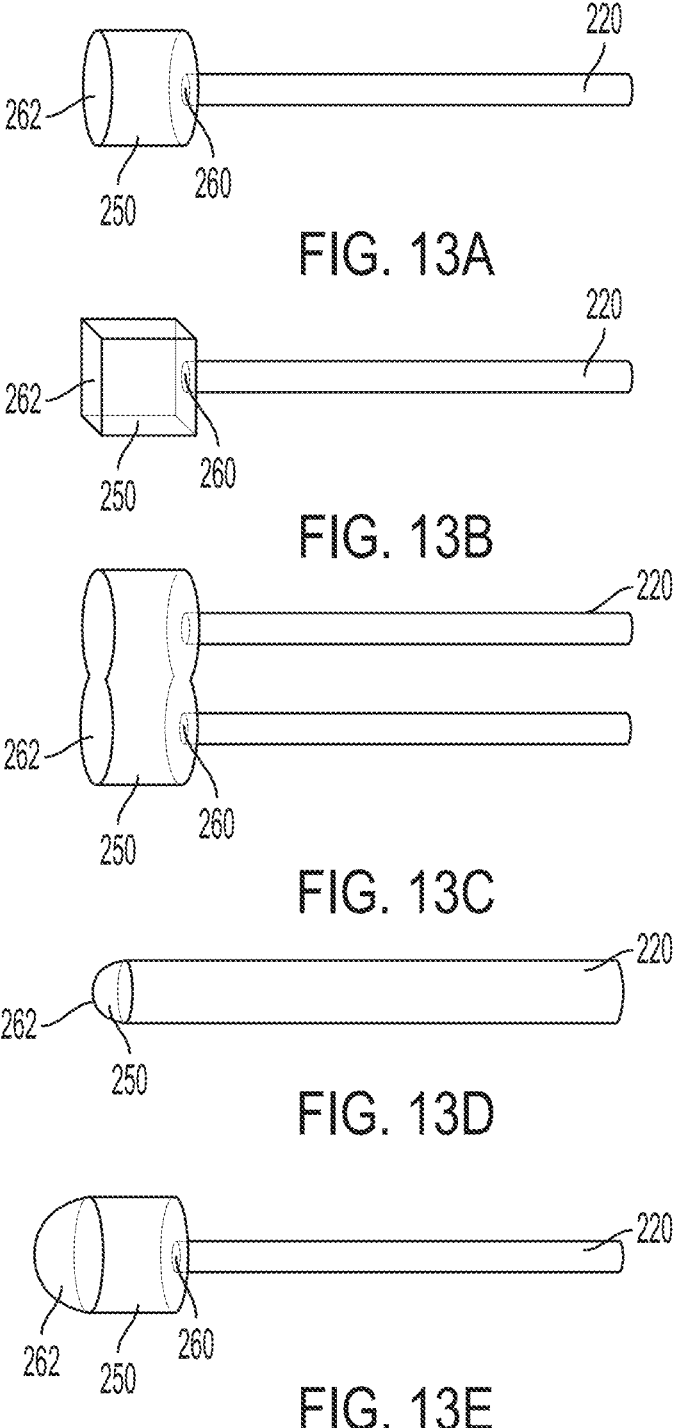
FIGS. 13A-13G show, according to some embodiments, optical fibers including endcaps.

In FIG. 13A, an endcap 250 is a cylindrical endcap, which is disposed upon and optically coupled to a distal end 260 of an optical fiber 220. For example, optical fiber 220 may be fused to endcap 250 at distal end 260. In the example of FIG. 13A, endcap 250 is a cylindrical endcap. According to certain embodiments, cylindrical endcaps may aid with the alignment of the associated optical fibers.

In FIG. 13A, the endcap 250 further comprises a distal surface 262, in some embodiments. A surface area of a distal surface of the endcap may be larger than a transverse cross sectional area of the optical fiber. As noted above, this may provide an increased transmission area of the laser energy within the endcap that is transmitted from the laser energy source. For example, laser energy transmitted from the laser energy source through optical fiber 220 and into endcap 250 may diverge within endcap 250, resulting in an increase in the transmission area of the laser energy transmission. FIG. 13B depicts another embodiment of an optical fiber with an endcap that is similar to FIG. 13A, except that in this embodiment, the endcap 250 disposed on and optically coupled to the distal end of the optical fiber 220 is a prism (e.g., a rectangular prism).

In the above embodiments, each optical fiber is optically coupled to a separate endcap. However, in some embodiments, two or more optical fibers of a plurality of optical fibers may be coupled to a single endcap. In some embodiments, optically coupling two or more optical fibers to an endcap may advantageously simplify alignment of the optical fibers, e.g., by enforcing the relative positions of the two or more optical fibers using the endcap. FIG. 13C presents such an embodiment. In the depicted embodiment, the distal ends 260 of two optical fibers 220 are coupled to endcap 250. While endcap 250 is coupled to two fibers in the illustrated embodiment, in some embodiments, the number of optical fibers coupled to an endcap in such an embodiment may be at least 2, at least 5, at least 10, at least 20, at least 30, and/or any other appropriate number of optical fibers. In some embodiments, the number of optical fibers coupled to an endcap may be less than or equal to 50, 40, 30, 20, 10, and/or any other appropriate number of optical fibers. Combinations of these ranges are possible. In some embodiments, every optical fiber in an additive manufacturing system is coupled to a single endcap. In other embodiments, multiple groups of optical fibers that are connected to separate endcaps may also be used.

FIG. 13D illustrates another exemplary endcap of an optical fiber 220, according to certain embodiments. In this embodiment, the endcap 250 is a microlens (e.g., a convex microlens) that is disposed on and optically coupled to the distal end 260 of the optical fiber 220. While in this embodiment the endcap has the same maximum transverse dimension as the distal end 260 of optical fiber to 220, a surface area of distal surface 262 of the endcap 250 is greater than a cross-sectional area of distal end 260 of the optical fiber 220 (e.g. the transmission area of a core of the optical fiber). In this embodiment, the endcap may function as a microlens, which may advantageously focus transmitted laser energy on a desired focal point as it exits the optical fiber. This may reduce the need for subsequent focusing using microlens arrays and other optical components disposed downstream from the optical fibers. Furthermore, a curvature of the distal surface 262 may reduce the back reflection of laser energy in an upstream axial direction towards the associated laser source. This may advantageously reduce the portion of reflected laser energy reaching the laser energy source. It should be appreciated that in some embodiments, the distal surface 262 may be formed directly from the optical fiber itself. In other words, the optical fiber may be processed (e.g., melting, shaped, polished, cut) to achieve a convex microlens at its distal end. Of course, alternate means of coupling a discrete microlens to a distal end of an optical fiber are also contemplated.

While the microlens endcap shown in FIG. 13D has the same maximum transverse dimension as the optical fiber, other variations of endcaps comprising microlenses are possible. For example, FIG. 13E presents an exemplary endcap 250 that is disposed on and optically coupled to a distal end of the optical fiber 220 where the endcap comprises a proximal cylindrical portion and a distal convex microlens portion. As with the embodiments described in FIGS. 13A-13D, the distal surface 262 of the endcap 250, which is the external surface of the distal convex microlens portion of endcap 250, has a surface area that is greater than a cross-sectional area of the distal end 260 of the optical fiber 220. Similar to the above, such a construction may increase a transmission area of the transmitted laser energy and focus the transmitted laser energy leaving the endcap.

Figure 13F:
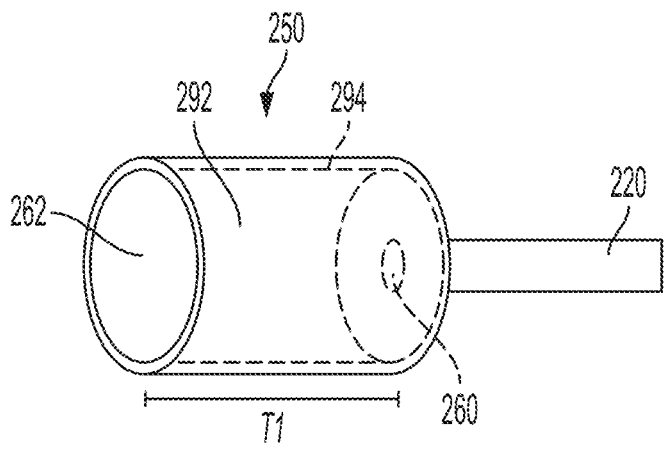
Figure 13G:
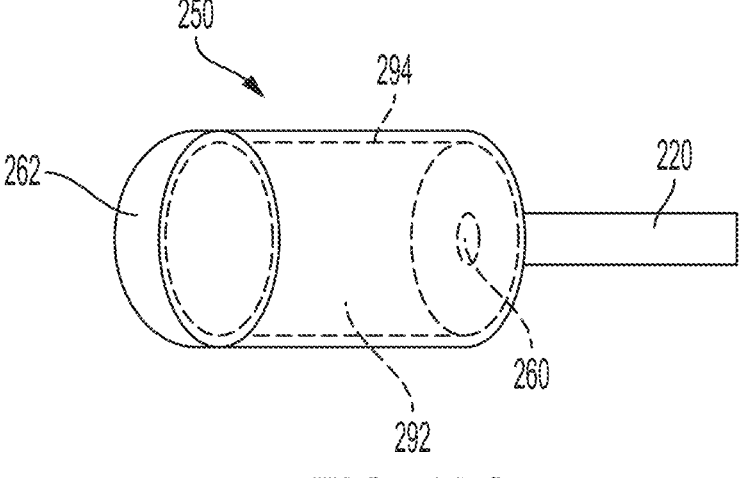

FIGS. 13F-13G illustrate exemplary endcaps 250 optically coupled to distal ends 260 of optical fibers 220. In some embodiments, as shown in FIG. 13F, the endcap 250 may include a proximal cylindrical portion formed of a core portion 292 surrounded by a cladding portion 294. The endcap 250 may further include a distal surface 262 which may be prismatic or flat, as shown in FIG. 13F, or, in some embodiments, may be convex (e.g., in the form of a micro-lens), as shown in FIG. 13G. As described previously, the increased surface area of the endcap distal surface 262 relative to the optical fiber distal end 260 may increase a transmission area of the transmitted laser energy and focus the transmitted laser energy leaving the endcap.

The core portion 292 of the endcap may be formed of any suitable material optically compatible with the laser employed in the additive manufacturing system, such as fused silica. The cladding 294, which may extend around the surface of the core portion 292 in the cylindrical portion may be formed of any suitable material with a lower index of refraction compared to the core. In this way, the interface between the high index core and lower index cladding may reduce the likelihood of laser energy leaking out of the core. The cylindrical portion of the endcap 250 may have any suitable thickness T1 measured along the longitudinal dimension of the optical fiber 220, as shown in FIG. 13F The thickness T1 may be at least 10 μm, 20 μm, 100 μm, 200 μm, 500 μm, 1 mm, 2 mm, 5 mm, 10 mm, 20 mm, 50 mm and/or any other suitable thickness. The thickness may also be less than or equal to 50 mm, 20 mm, 10 mm, 5 mm, 2 mm, 1 mm, 500 μm, 200 μm, 100 μm, 20 μm, 10 μm, and/or any other suitable thickness. Combinations of the foregoing ranges are also contemplated, including, but not limited to, a thickness T1 between 10 μm and 50 mm, 100 μm and 10 mm, and/or any other suitable range. Of course, other ranges, including ranges both greater than and less than those noted above are also contemplated as the present disclosure is not so limited.

It should be appreciated that the endcaps described herein may have one or more surface treatments and/or coatings to achieve desirable optical properties. For example, the end-caps may include surface treatments to manage the reflec-tions or other means of routing laser energy propagating within the optical fibers. The endcaps may be polished, textured, coated with thin films (including, but not limited to, reflective coatings such as gold and absorptive coatings), combinations thereof, and/or any other surface treatment and/or coating.

Figure 14A:
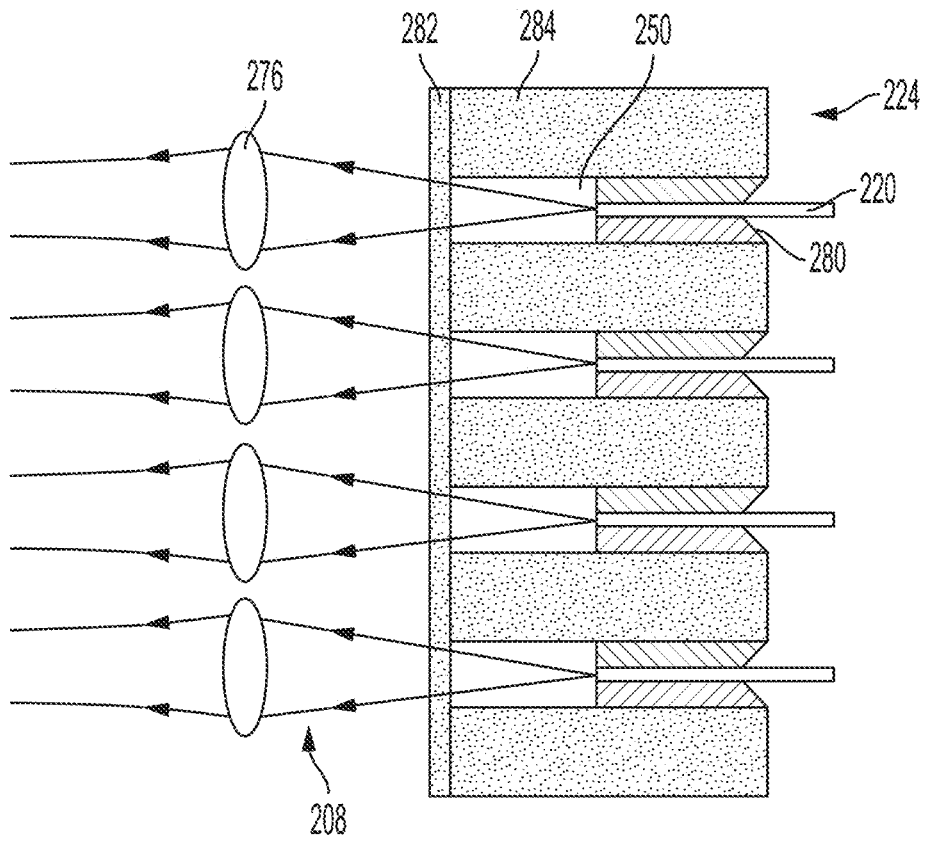
FIGS. 14A-14C show, according to some embodiments, top views of transmission of laser energy through endcaps coupled to optical fibers.
Figure 14B:
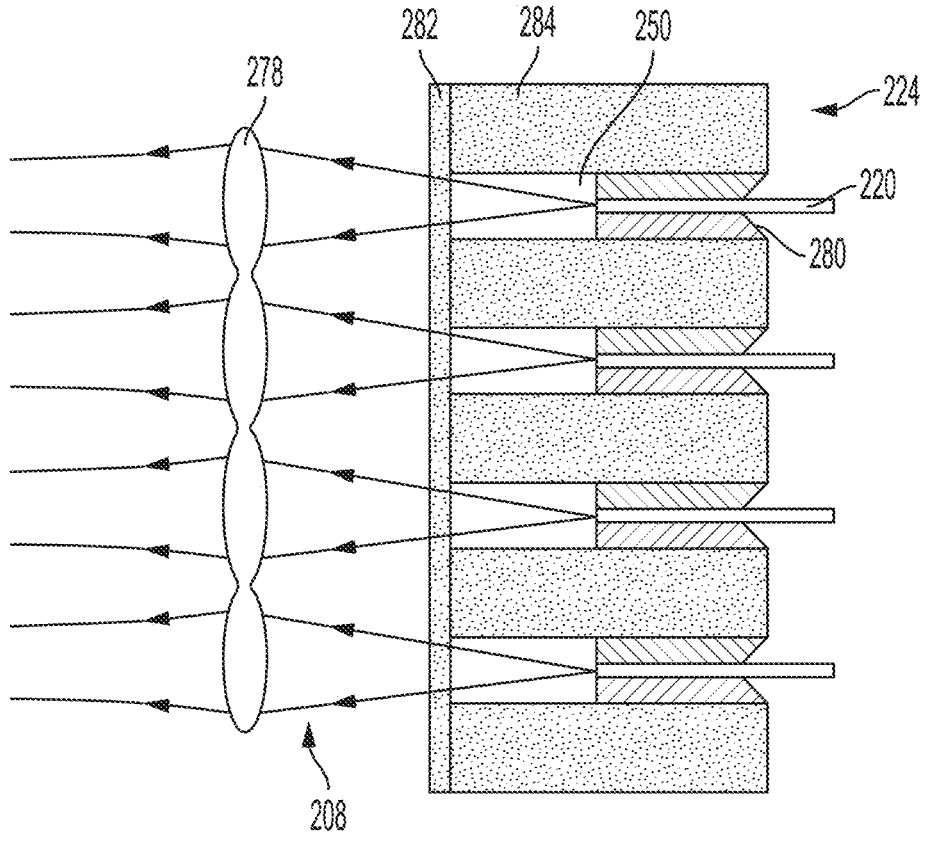
Figure 14C:
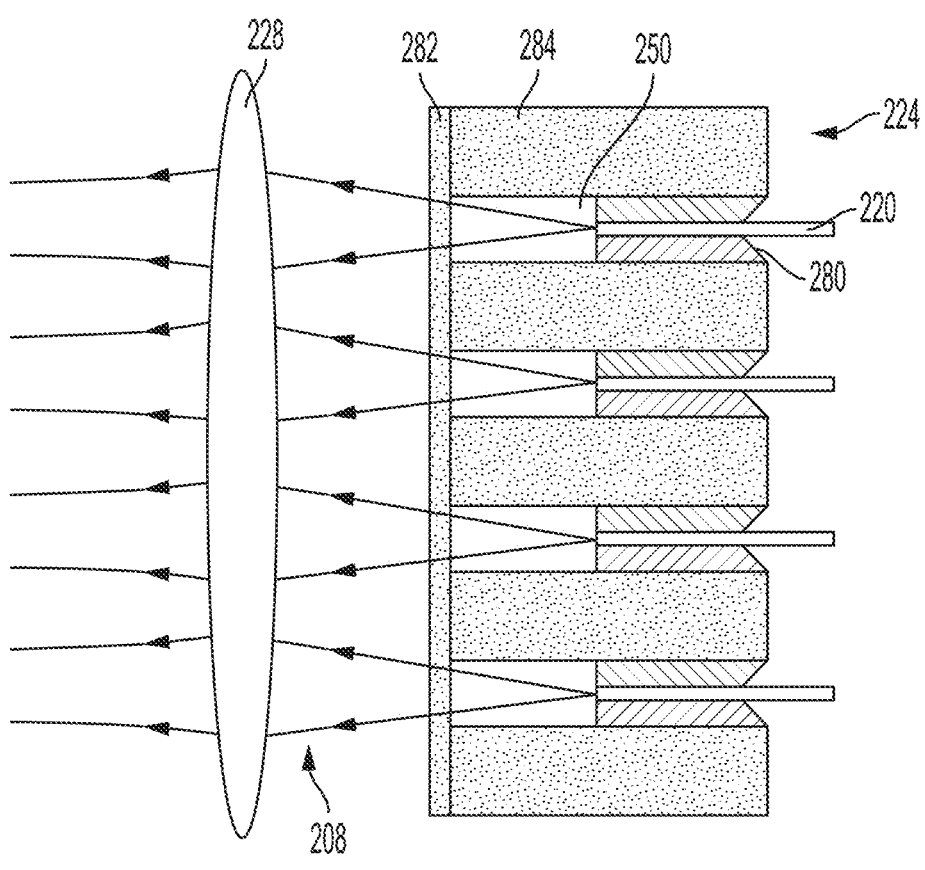

FIGS. 14A-14C depict a schematic top-view of the trans-mission of laser energy from an array of optical fibers 220 and associated endcaps 250. The fibers and endcaps may be positioned in an alignment fixture 224 (e.g., alignment fixture 108 or 110 of FIGS. 1 and 6), resting within align-ment features 280, which may be v-grooves. The endcaps may be registered against a proximal surface 284 of a transparent structure 282, with the result that the distal-most ends of endcaps 250 are aligned with a desired axial posi-tion. However, any appropriate alignment fixture with the one or more optical fibers and endcaps position therein may be used. In this embodiment, laser energy 208 transmitted from endcaps 250 is directed onto a plurality of separate microlenses 276, which are arranged in an array that is aligned with the array of endcaps. FIG. 14B depicts a similar arrangement to FIG. 14A, except that the microlenses are provided in the form of a microlens array where the indi-vidual microlenses are formed in a single structure 278. FIG. 14C depicts a similar arrangement to FIG. 14A, except that a macrolens 228 is aligned with the optical fibers and endcaps.

It should be appreciated that the transparent structure 282 and its associated proximal surface 284 may be formed of and/or coated with materials that exhibit desirable optical properties (e.g., absorption, reflection, stray light routing) and/or thermal properties for thermal management. In some embodiments, the transparent structure 282 may be inte-grated with an active or passive cooling system to cool the endcaps and/or optical fibers. For example, the transparent structure 282 may include integrated cooling channels where a cooling fluid may flow. In some embodiments, one or more surfaces of the transparent structure 282 may include an antireflective coating. In some embodiments, one or more surfaces of the transparent structure 282 may include pat-terned features, such as absorber coatings, thin film coatings, reflective coatings, and/or any other feature which may have desirable optical properties.

Figure 15:
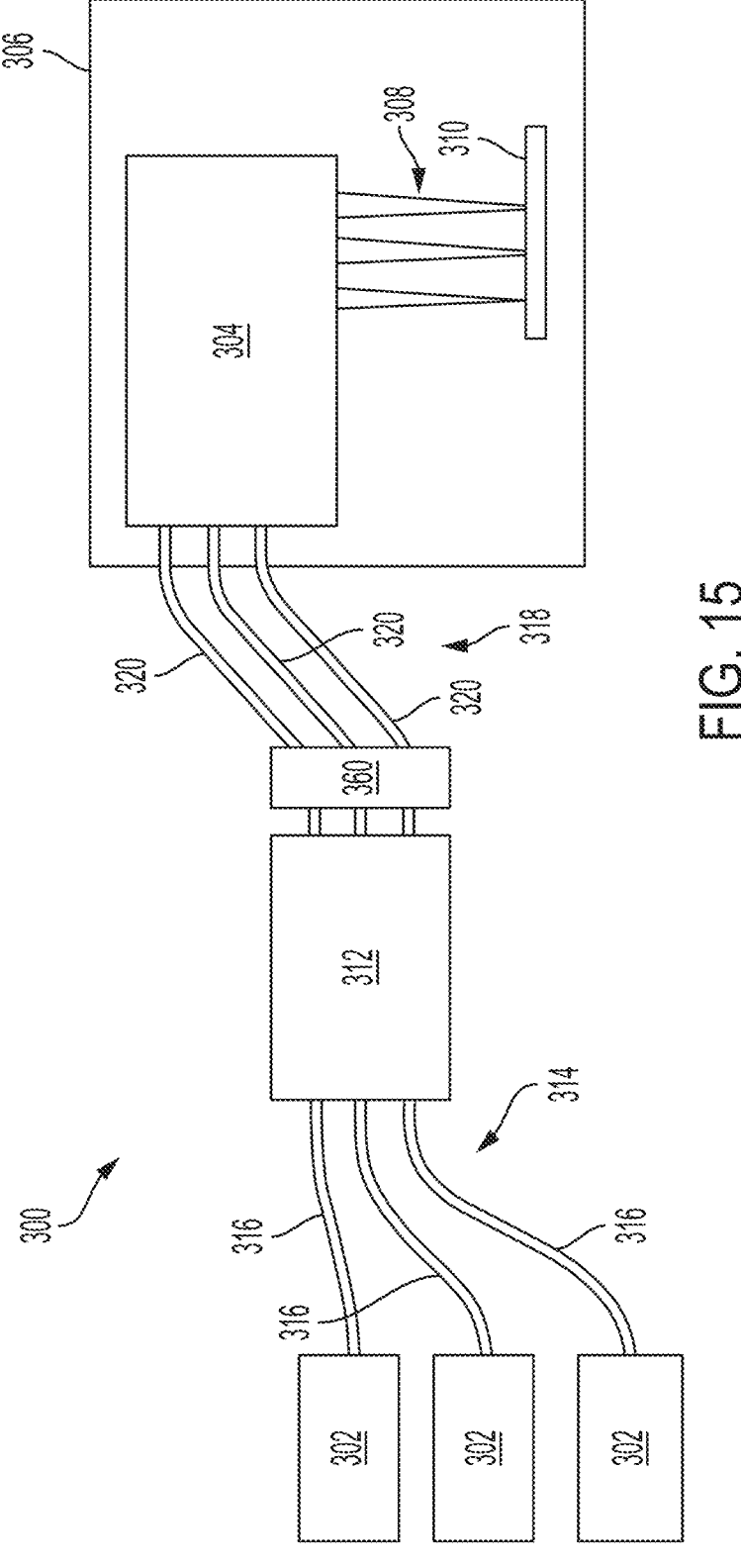
FIG. 15 shows, according to some embodiments, an additive manufacturing system.

FIG. 15 shows, according to some embodiments, a sche-matic representation of an additive manufacturing system 300, including a plurality of laser energy sources 302 that deliver laser energy to an optics assembly 304 positioned within a machine enclosure 306. For example, the machine enclosure may define a build volume in which an additive manufacturing process may be carried out. In particular, the optics assembly may direct laser energy 308 towards a build surface 310 positioned within the machine enclosure to selectively fuse powdered material on the build surface. As described in more detail below, the optics assembly 304 may include a plurality of optics defining an optical path within the optics assembly that may transform, shape, and/or direct laser energy within the optics assembly such that the laser energy is directed onto the build surface as an array of laser energy pixels. The optics assembly may be movable within machine enclosure 306 to scan laser energy 308 across build surface 310 during a manufacturing process, though embodiments in which the optics assembly is stationary relative to the build surface are also contemplated.

Additive manufacturing system 300 further includes an optical fiber connector 312 positioned between the laser energy sources 302 and the optics assembly 304. As illus-trated, a first plurality of optical fibers 314 may extend between the plurality of laser energy sources 302 and the optical fiber connector 312. In particular, each laser energy source 302 is coupled to the optical fiber connector 312 via a respective optical fiber 316 of the first plurality of optical fibers 314. Similarly, second plurality of optical fibers 318 extends between the optical fiber connector 312 and the optics assembly 304. Each optical fiber 316 of the first plurality of optical fibers 314 is coupled to a corresponding optical fiber 320 of the second plurality of optical fibers 318 within the optical fiber connector. In this manner, laser energy from each of the laser energy sources 302 is delivered to the optics assembly 304 such that laser energy 308 can be directed onto the build surface 310 during an additive manufacturing process (i.e., a build process).

In some instances, the laser energy sources 302 and optical fiber connector 312 may be stationary relative to a machine enclosure 306. In this manner, the optical fibers 316 of the first plurality of optical fibers 314 may remain substantially stationary throughout a build process, which may aid in avoiding applying stresses to the optical fibers and/or connections or couplings of the optical fibers, which can lead to failure of the optical fibers. Depending on the embodiment, the optical fibers 320 of the second plurality of optical fibers 318 may be movable relative to the stationary optical fiber connector 312 by virtue of their coupling to a movable optics assembly 304. While such movement may impart stresses onto the optical fibers and/or connections or couplings of the optical fibers, aspects described herein may facilitate rapid and simple replacement of the optical fibers 320.

The additive manufacturing system 300 may also include one or more optical components 360, such as the optical baffle(s), alignment fixture(s), and/or mechanical fixture(s) described above. It should be appreciated that although optical component 360 is shown as a single block positioned between the fiber connectors and the optics assembly, any other suitable arrangement of the optical components or number of features, positioned anywhere along the optical pathway between the laser energy sources 302 and build surface 310 may be implemented.

Figure 16:
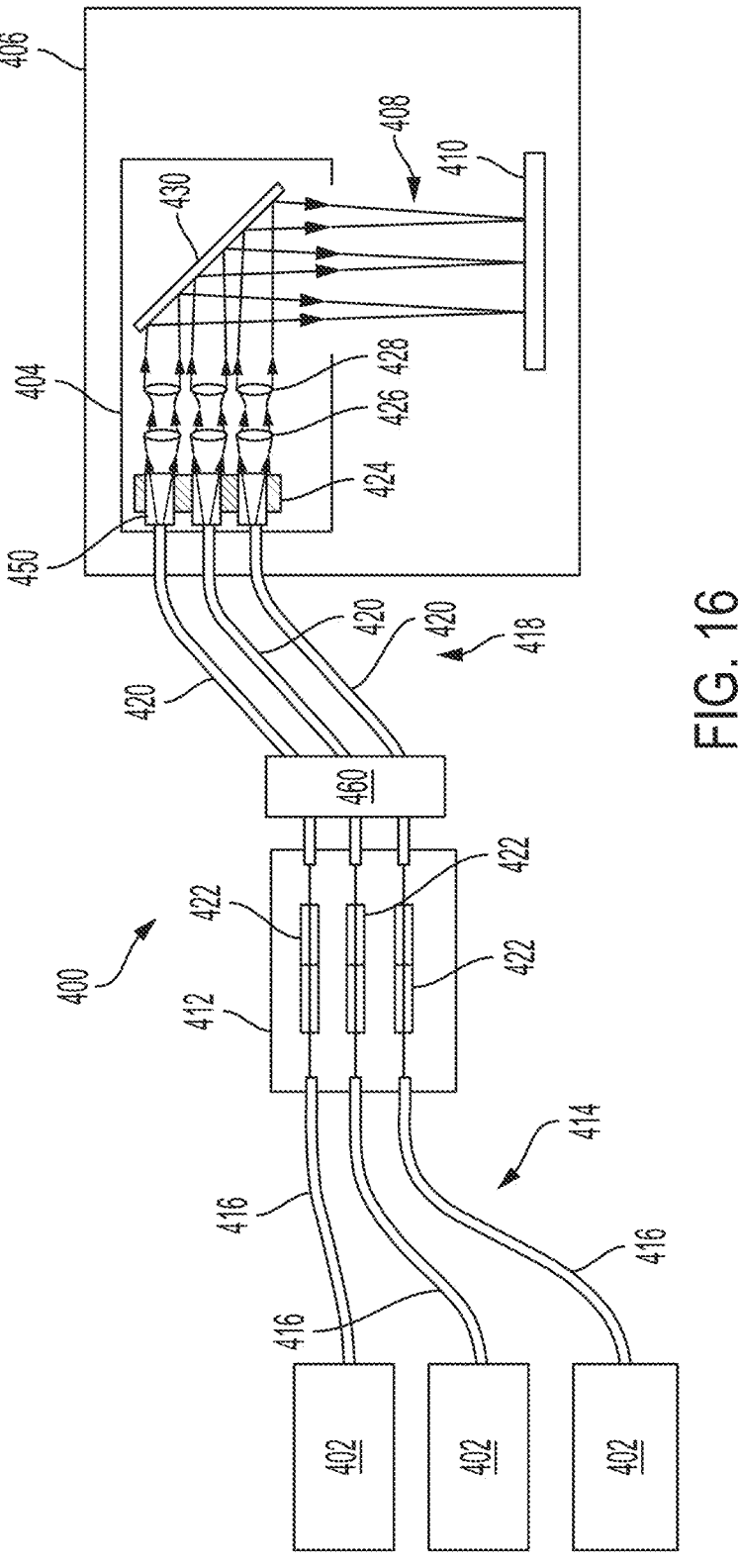
FIG. 16 shows, according to other embodiments, an additive manufacturing system.

FIG. 16 shows a schematic representation of another embodiment of an additive manufacturing system 400. Similar to the embodiment discussed above in connection with FIG. 15, the additive manufacturing system 400 includes a plurality of laser energy sources 402 coupled to the optics assembly 404 within the machine enclosure 406 via the optical fiber connector 412. The first plurality of optical fibers 414 extends between the laser energy sources 402 and the optical fiber connector 412, and the second plurality of optical fibers 418 extends between the optical fiber connector 412 and optics assembly 404. In particular, each optical fiber 416 of the first plurality of optical fibers is coupled to a laser energy source 402 and corresponding optical fiber 420 of the second plurality of optical fibers 418. In the depicted embodiment, optical fibers 416 are coupled to corresponding optical fibers 420 via fusion splices 422 within the optical fiber connector 412. However, embodiments, in which the optical fibers positioned within the connector include endcaps as described herein are also envisioned.

In the depicted embodiment, the optical fibers 420 of the second plurality of optical fibers 418 are optically coupled to one or more corresponding endcaps 450 disposed on the distal ends of the second plurality of optical fibers. The endcaps 450 are optically coupled to an optics assembly 404 of the system. For example, an alignment fixture 424 configured to define a desired spatial distribution of the optical fibers and endcaps may be used to direct laser energy into the optics assembly. For example, the alignment fixture may comprise a block having a plurality of v-grooves or holes in which each endcap 450 may be positioned and coupled to in order to accurately position the optical fibers and endcaps within the system. Further embodiments and examples of endcaps and alignment fixtures are discussed elsewhere herein.

The alignment fixture may be used to align each of the optical fibers 420 of the second plurality of optical fibers 418 with one or more corresponding optical components of the optics assembly 404. Consequently, separate alignment operations for each optical fiber 420 (corresponding to each laser energy source 402) may not be required, which may facilitate rapid replacement of the second plurality of optical fibers 418 if needed or otherwise desired (e.g., if one or more optical fibers 420 fails).

Additionally, FIG. 16 depicts exemplary optics that are optically coupled downstream from the second plurality of optical fibers 418 and the associated endcaps 450. The various optics may be included in the optics assembly to direct laser energy from the second plurality of optical fibers 418 onto the build surface 410, and to form a desired array of laser energy 408 on the build surface. For example, the optics assembly may include beam forming optics such as lenses 426 and 428 (which may be individual lenses, lens arrays, and/or combined macrolenses), mirrors 430, and/or any other appropriate type of optics disposed along the various optical paths between the endcaps and the build surface which may shape and direct the laser energy within the optics assembly. In some embodiments, lenses 426 and 428 may include one or more of micro-lens arrays, and objective lenses. For example, micro-lens arrays may be arranged to collimate the laser energy output from each optical fiber 420 and transform the beam shape of the laser energy, and objective lenses may be arranged to define a focal length for the combined array of laser energy and serve to demagnify or magnify the output from the micro-lens array. In some instances, this demagnification or magnification may be used to adjust the spacing of laser energy pixels in the array of laser energy formed on the build surface. For example, the objective lenses may be arranged to demagnify the array such that there is no spacing between adjacent pixels. Moreover, it should be understood that the current disclosure is not limited to any particular shape, spacing, and/or arrangement of laser energy pixels in the array of laser energy 408 formed on the build surface. For example, the array may be a rectangular array with regularly spaced pixels of laser energy, or the array may be an irregular shape with non-uniform spacing between pixels.

The additive manufacturing system 400 may also include one or more optical components 460, such as the optical baffle(s), alignment fixture(s), and/or mechanical fixture(s) described above. It should be appreciated that although optical component 460 is shown as a single block positioned between the fiber connectors and the optics assembly, any other suitable arrangement of the optical components or number of features, positioned anywhere along the optical pathway between the laser energy sources 402 and build surface 410 may be implemented.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "car-rying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An additive manufacturing system comprising:
at least one laser energy source;
an optics assembly configured to direct laser energy from the at least one laser energy source onto a build surface to form at least one laser energy spot on the build surface;
a plurality of optical fibers optically coupling the at least one laser energy source with the optics assembly;
a holder configured to support at least a portion of each optical fiber of the plurality of optical fibers; and
a resilient member configured to apply a force to bias the portion of at least one optical fiber of the plurality of optical fibers in a direction towards the holder.

2. The additive manufacturing system of claim 1, wherein the at least one optical fiber includes at least one endcap disposed on a distal portion of the at least one optical fiber.

3. The additive manufacturing system of claim 2, wherein the resilient member is configured to bias the at least one endcap towards the holder.

4. The additive manufacturing system of claim 3, wherein the holder is a first holder configured to support the at least one endcap and the resilient member is a first resilient member configured to bias the at least one endcap towards the first holder, and further comprising:
a second holder configured to support the portion of the at least one optical fiber; and
a second resilient member is configured to bias the at least one optical fiber towards the second holder.

5. The additive manufacturing system of claim 4, wherein the second holder is disposed on the first holder.

6. The additive manufacturing system of claim 2, wherein the at least one endcap is configured to increase a transmission area of laser energy transmitted from the at least one laser energy source to reduce a power area density of the transmitted laser energy.

7. The additive manufacturing system of claim 2, wherein the at least one endcap is selected from the group of a cylinder, a prism, and a microlens.

8. The additive manufacturing system of claim 2, wherein a surface area of a distal surface of the at least one endcap is larger than a transverse cross sectional area of a distal end of the at least one optical fiber.

9. The additive manufacturing system of claim 1, wherein the optics assembly comprises at least one stray light baffle optically coupled to the at least one optical fiber, the at least one stray light baffle comprising at least one tapered surface configured to redirect at least a portion of stray laser energy directed toward the at least one laser energy source.

10. The additive manufacturing system of claim 1, wherein the resilient member is configured to transport heat away from at least a portion of the at least one optical fiber.

11. The additive manufacturing system of claim 1, wherein the resilient member is configured to be actively cooled.

12. The additive manufacturing system of claim 1, wherein the holder is configured to fix a position and/or orientation of the portion of the at least one optical fiber.

13. The additive manufacturing system of claim 12, wherein the holder is an alignment fixture including at least one alignment feature configured to be engaged with the at least one optical fiber to position and/or oriented the at least one optical fiber.

14. The additive manufacturing system of claim 1, wherein the at least one laser energy source is a plurality of laser energy sources, and wherein each optical fiber of the plurality of optical fibers is coupled to a respective laser energy source of the plurality of laser energy sources.

15. The additive manufacturing system of claim 1, wherein the resilient member includes at least one resilient finger configured to be engaged with the at least one optical fiber.

16. A method for additive manufacturing, comprising:
transmitting laser energy from at least one laser energy source along an axial dimension of at least one optical fiber of a plurality of optical fibers; and
applying a force to bias a portion of at least one optical fiber of the plurality of optical fibers in a direction towards a holder with a resilient member, the holder configured to support the at least a portion of the at least one optical fiber.

17. The method of claim 16, further comprising:
directing laser energy output from at least one endcap disposed on a distal portion of the at least one optical fiber;
biasing the at least one endcap towards the holder with the resilient member; and
supporting the at least one endcap with the holder.

18. The method of claim 16, further comprising:
directing laser energy output from at least one endcap disposed on a distal portion of the at least one optical fiber;
biasing the at least one endcap towards a second holder with a second resilient member; and
supporting the at least one endcap with the second holder.

19. The method of claim 16, further comprising:
directing laser energy through at least one stray light baffle optically coupled to the at least one optical fiber; and
redirecting at least a portion of stray laser energy directed toward the at least one laser energy source with at least one tapered surface of the at least one stray light baffle.

20. The method of claim 16, further comprising transporting heat away from at least a portion of the at least one optical fiber with the resilient member.

21. The method of claim 16, further comprising fixing a position and/or orientation of the portion of the at least one optical fiber with the holder.

22. The method of claim 21, wherein the holder is an alignment fixture including at least one alignment feature, and further comprising engaging the at least one optical fiber with the at least one alignment feature to position and/or oriented the at least one optical fiber.

23. An additive manufacturing system comprising:
a plurality of laser energy sources;
an optics assembly configured to direct laser energy from the plurality of laser energy sources onto a build surface to form at least one laser energy spot on the build surface;
a plurality of optical fibers configured to optically couple the plurality of laser energy sources with the optics assembly; and
at least one stray light baffle optically coupled to at least one optical fiber of the plurality of optical fibers, the at least one optical fiber coupled to at least one laser energy source of the plurality of laser energy sources, the at least one stray light baffle disposed between a distal end and a proximal end of the at least one optical fiber, the at least one stray light baffle comprising at least one tapered surface configured to redirect at least a portion of stray laser energy directed toward the at least one laser energy source.

24. The additive manufacturing system of claim 23, further comprising:
a holder configured to support at least a portion of the at least one optical fiber; and
a resilient member configured to bias at least a portion of the at least one optical fiber towards the holder.

25. The additive manufacturing system of claim 23, wherein the at least one stray light baffle is configured to transport heat away from the at least one optical fiber.

26. The additive manufacturing system of claim 23, wherein the at least one stray light baffle is in thermal communication with a heat exchanger configured to cool at least a portion of the at least one optical fiber.

27. The additive manufacturing system of claim 23, wherein the at least one stray light baffle is configured to reflect, absorb, and/or scatter the portion of stray laser energy.

28. The additive manufacturing system of claim 23, wherein the at least one stray light baffle comprises at least one holder portion configured to support at least a portion of the at least one optical fiber.

29. The additive manufacturing system of claim 23, wherein a transverse dimension of the at least one tapered surface increases in an upstream direction.

30. A method for additive manufacturing, comprising:
transmitting laser energy from at least one laser energy source of a plurality of laser energy sources along a longitudinal direction of at least one optical fiber of a plurality of optical fibers;
redirecting at least a portion of stray laser energy directed toward the plurality of laser energy sources with at least one tapered surface of at least one stray light baffle, the at least one stray light baffle optically coupled to the at least one optical fiber, the at least one stray light baffle disposed along a length of the at least one optical fiber between a distal end and a proximal end of the at least one optical fiber; and
directing laser energy output from a distal portion of the at least one optical fiber onto a build surface to form at least one laser energy spot on the build surface.

31. The method of claim 30, further comprising biasing at least a portion of the at least one optical fiber towards a holder with a resilient member; and
supporting the portion of the at least one optical fiber with the holder.

32. The method of claim 31, further comprising:
directing laser energy output from at least one endcap disposed on a distal portion of the at least one optical fiber;
biasing the at least one endcap towards the holder with the resilient member; and
supporting the at least one endcap with the holder.

33. The method of claim 31, further comprising:
directing laser energy output from at least one endcap disposed on a distal portion of the at least one optical fiber;
biasing the at least one endcap towards a second holder with a second resilient member; and
supporting the at least one endcap with the second holder.

34. The method of claim 30, further comprising transporting heat away from at least a portion of the at least one optical fiber with the at least one stray light baffle.

35. The method of claim 30, further comprising reflecting, absorbing, and/or scattering the portion of stray laser energy.

36. The method of claim 30, further comprising fixing a position and/or orientation of the at least one optical fiber with a holder portion of the at least one stray light baffle.

37. The method of claim 30, wherein a transverse dimension of the at least one tapered surface increases in an upstream direction.

38. The additive manufacturing system of claim 23, wherein each laser energy source of the plurality of laser energy sources is coupled to a respective optical fiber of the plurality of optical fibers.

39. The additive manufacturing system of claim 38, wherein the at least one stray light baffle comprises a first stray light baffle comprising the at least one tapered surface, the first stray light baffle coupled to each optical fiber of the plurality of optical fibers.

40. The method of claim 30, wherein transmitting the laser energy from the at least one laser energy source along the longitudinal direction of the at least one optical fiber comprising transmitting laser energy from each laser energy source of the plurality of laser energy sources to a respective optical fiber of the plurality of optical fibers.

41. The method of claim 40, wherein redirecting the portion of stray laser energy comprises redirecting a respective portion of stray laser energy directed toward each laser energy source along the respective optical fiber.

42. The method of claim 16, wherein transmitting the laser energy from the at least one laser energy source comprises transmitting the laser energy from a first laser energy source along a longitudinal direction of a first optical fiber of a plurality of optical fibers, and wherein each laser energy source of the of at least one laser energy source is coupled to a respective optical fiber of the plurality of optical fibers.

43. The additive manufacturing system of claim 1, wherein the resilient member is configured to bias the portion of the at least one optical fiber towards the holder in a direction which is angled relative to a longitudinal axis of the at least one optical fiber.

44. The additive manufacturing system of claim 43, wherein the direction is perpendicular relative to the longitudinal axis of the at least one optical fiber.

45. The method of claim 16, wherein biasing the portion of the at least one optical fiber towards the holder includes biasing the portion of the at least one optical fiber towards the holder in a direction which is angled relative to a longitudinal axis of the at least one optical fiber.

46. The method of claim 45, wherein the direction is perpendicular relative to the longitudinal axis of the at least one optical fiber.

* * * * *